United States Patent
Hanaman et al.

(10) Patent No.: US 6,963,826 B2
(45) Date of Patent: Nov. 8, 2005

(54) PERFORMANCE OPTIMIZER SYSTEM AND METHOD

(75) Inventors: David Wallace Hanaman, Princeton, NJ (US); Mauricio Barberi, New York, NY (US); Michael Ahearne, Storrs, CT (US); Frank Lupo, Mendham, NJ (US); George Sivulka, Jr., Englewood Cliffs, NJ (US); Russell John Nuzzo, New York, NY (US); David John Gallagher, Tuckahoe, NY (US); Bharath Kumar Janakarajan, Jersey City, NJ (US)

(73) Assignee: C3i, Inc., New York, NY (US)

( * ) Notice: Subject to any disclaimer, the term of this patent is extended or adjusted under 35 U.S.C. 154(b) by 0 days.

(21) Appl. No.: 10/668,476

(22) Filed: Sep. 22, 2003

(65) Prior Publication Data

US 2005/0065756 A1 Mar. 24, 2005

(51) Int. Cl.[7] .................................................. G06F 15/00
(52) U.S. Cl. .................... 703/2; 703/6; 705/1; 705/10; 705/26; 705/29; 719/328; 709/224
(58) Field of Search ............................. 703/2, 6; 705/1, 705/10, 29, 26, 36; 709/224, 328; 719/328

(56) References Cited

U.S. PATENT DOCUMENTS

| | | | |
|---|---|---|---|
| 5,675,510 A | 10/1997 | Coffey et al. | |
| 5,696,702 A | 12/1997 | Skinner et al. | |
| 5,964,839 A | 10/1999 | Johnson et al. | |
| 6,065,138 A | 5/2000 | Gould et al. | |
| 6,397,256 B1 | 5/2002 | Chan et al. | |
| 6,424,979 B1 * | 7/2002 | Livingston et al. | 715/511 |
| 6,446,119 B1 | 9/2002 | Olah et al. | |
| 2002/0042755 A1 * | 4/2002 | Kumar et al. | 705/26 |
| 2002/0111887 A1 | 8/2002 | McFarlane et al. | |
| 2002/0128803 A1 | 9/2002 | Skinner et al. | |
| 2002/0129139 A1 | 9/2002 | Ramesh | |
| 2002/0133394 A1 | 9/2002 | Bushey et al. | |
| 2002/0152397 A1 | 10/2002 | McKay et al. | |
| 2003/0005072 A1 | 1/2003 | Olah et al. | |
| 2003/0040889 A1 | 2/2003 | Coffey et al. | |
| 2003/0115377 A1 * | 6/2003 | Curtis et al. | 709/328 |
| 2004/0045014 A1 * | 3/2004 | Radhakrishnan | 719/328 |
| 2004/0093296 A1 * | 5/2004 | Phelan et al. | 705/36 |
| 2004/0102995 A1 * | 5/2004 | Boppana | 705/1 |
| 2004/0128185 A1 * | 7/2004 | Tsai | 705/10 |

OTHER PUBLICATIONS

Bob Godfrey, "Electronic Monitoring: An Ethical Model," 2nd Australian Institute of Computer Ethics Conference, Canberra, Australia, Dec. 2000, p. 4.
Black Box: Computer Monitoring Software, <http://www.enfiltrator.com/black_box/index.htm.
Computer and Internet Surveillance Technologies and Their Applications in the Workplace: Rough Notes, <http://www.pco.org.hk/.

(Continued)

Primary Examiner—Thai Phan
(74) Attorney, Agent, or Firm—Ostrolenk, Faber, Gerb & Soffen, LLP

(57) ABSTRACT

Information is received from a plurality of CRM/SFA sources within an operating environment and is mapped to specific business processes. Transactional data, learning systems information, technical support information and usage data is aggregated and used to provide a dimensional model of the data. The present invention provides a mapping view of technology usage to one or more business practices and reflects, among other things, the extent to which customer relationship management technology is impacting sales representative performance.

58 Claims, 39 Drawing Sheets

OTHER PUBLICATIONS

Perfect Keylogger–easy to use solution for PC and Internet surveillance, <http://www.blazingtools.com/bpk.html>.

NETObserve 2.8 from Explore Anywhere: Powerful Employee Monitoring Software, <http://www.detective-software.net/_observe.asp>.

Invisible Keylogger: Completely Undetectable, <http://www.invisiblekeylogger.com/invisible-keylogger.html>.

KeyLog Pro: Find out in less than 24 hours!!!, <http://www..keylogpro.com/products.html>.

Keylogger.biz: Stealth Keyboard Interceptor for Windows NT /2000/XP, <http://www.keylogger.biz/skin2000.html>.

Keyloggers.com: PC Activity Monitor Series, <http://www.keyloggers.com/pcacme_pro.html>.

KoloSoft: Kolosoft Intruder; <http://www.kolosoft.com/products.htm>.

Blue–series: PC Agent Version 3.6, <http://www.blue-series.de/products/pca/pca_uk.htm>.

Spector Pro v4.0: Record all their Emails, Chats, Keystrokes and Web Sites Visited, <http://www..spectorsoft.com/products/SpectorPro_Windows/index.html>.

Stealth Software Rankles Privacy Advocates, <http://www.techweb.com/wire/story/TWB19990917S0014>.

Sureshot software: Ghost Keylogger v3..71, <http://www.keylogger.net/index.html>.

TrueActive Software, Formerly WinWhatWhere Corp., <http://www.trueactive.com/features/index.htm>.

* cited by examiner

BUSINESS PROCESSES AND SUB-PROCESSES

- ADMIN
  - > INFORMATIONAL
  - > SYSTEM
  - >TIME OFF TERRITORY
- ANALYSIS
  - > EFFORT
  - > INFORMATIONAL
  - > MARKET
  - > PLANNING
- EVENTS
  - > EXECUTION
  - > PLANNING

- POSTCALL
  - > DETAILING
  - > INFORMATIONAL
- PRECALL
  - > INFORMATIONAL
  - > PLANNING
  - > SCHEDULING

- OTHER (INCLUDED)
- MANAGER (NOT INCLUDED)

FIG. 5A

DEPENDENT VARIABLE: ATTAINMENT OF QUOTA

- CRM SYSTEM DIAGNOSTICS: SESSIONS, SYNCS, QUERIES, TIMEOUTS

- TIME ELEMENTS: PRECALL-SCHEDULING, PRECALL-PLANNING, PRECALL-INFORMATIONAL, POSTCALL-DETAILING, POSTCALL-INFORMATIONAL, EVENT-PLANNING, EVENT-EXECUTION, ANALYSIS-PLANNING, ANALYSIS-MARKET, ANALYSIS-INFORMATIONAL, ANALYSIS-EFFORT, ADMIN-TOT, ADMIN-SYSTEM, ADMIN-INFORMATIONAL, OTHER VIEWS

- HITS ELEMENTS: PRECALL-SCHEDULING, PRECALL-PLANNING, PRECALL-INFORMATIONAL, POSTCALL-INFORMATIONAL, POSTCALL-DETAILING, EVENT-PLANNING, EVENT-EXECUTION, ANALYSIS-PLANNING, ANALYSIS-MARKET, ANALYSIS-INFORMATIONAL, ANALYSIS-EFFORT, ADMIN-TOT, ADMIN-SYSTEM, ADMIN-INFORMATIONAL, OTHER VIEWS

- EFFORT: ACTIVITIES, DETAILS

- HELPDESK: OFF THE SHELF, HARDWARE, CLIENT SPECIFIC, BUSINESS EVENTS, CONNECTIVITY, EMAIL, SFA-CRM

- INDICATORS: ISS REPS, TRAINER REPS

- DEMOGRAPHIC: YEARS IN TERRITORY, YEARS WITH BERLEX, QUOTA END OF YEAR

FIG. 5B

DEPENDENT VARIABLE: DETAILS

- CRM SYSTEM DIAGNOSTICS: SESSIONS, SYNCS, QUERIES, TIMEOUTS

- TIME ELEMENTS: PRECALL-SCHEDULING, PRECALL-PLANNING, PRECALL-INFORMATIONAL, POSTCALL-DETAILING, POSTCALL-INFORMATIONAL, EVENT-PLANNING, EVENT-EXECUTION, ANALYSIS-PLANNING, ANALYSIS-MARKET, ANALYSIS-INFORMATIONAL, ANALYSIS-EFFORT, ADMIN-TOT, ADMIN-SYSTEM, ADMIN-INFORMATIONAL, OTHER VIEWS

- HITS ELEMENTS: PRECALL-SCHEDULING, PRECALL-PLANNING, PRECALL-INFORMATIONAL, POSTCALL-DETAILING, POSTCALL-INFORMATIONAL, EVENT-PLANNING, EVENT-EXECUTION, ANALYSIS-PLANNING, ANALYSIS-MARKET, ANALYSIS-INFORMATIONAL, ANALYSIS-EFFORT, ADMIN-TOT, ADMIN-SYSTEM, ADMIN-INFORMATIONAL, OTHER VIEWS

- HELPDESK: OFF THE SHELF, HARDWARE, CLIENT SPECIFIC, BUSINESS EVENTS, CONNECTIVITY, EMAIL, SFA-CRM

- INDICATORS: ISS REPS, TRAINER REPS

- DEMOGRAPHIC: YEARS IN TERRITORY

FIG. 5C

DEPENDENT VARIABLES: HITS AND USAGE

- EFFORT: ACTIVITIES, DETAILS

- HELPDESK: OFF THE SHELF, HARDWARE, CLIENT SPECIFIC, BUSINESS EVENTS, CONNECTIVITY EMAIL, SFA-CRM

- INDICATORS: ISS REPS, TRAINER REPS

- DEMOGRAPHIC: YEARS IN TERRITORY

FIG. 5D

| ACCOUNT (COMPANY) | ASSET | CALL DETAIL (CONTACT) | FULFILLMENT (DELIVERY/SHIPMENT) |
|---|---|---|---|
| INVENTORY | INVOICE/ORDER | OFFER (PROMOTIONS) | PHYSICIAN (END CLIENT) |
| POD | PRODUCT | QUEUE/SWITCH | QUOTA (TRANSACTION) |
| SALES REPRESENTATIVE (CLIENT EMPLOYEE) | SCREEN | SEGMENT | SUPPORT CENTER (HELP DESK) |
| SURVEY | TERRITORY | TIME | USAGE |

FIG. 8

PERFORMANCE OPTIMIZER SYSTEM AND METHOD

BACKGROUND OF THE INVENTION

1. Field of the Invention

The present invention relates to data warehousing, and more particularly to performing dimensional modeling on data received in technology such as customer relationship management system environments.

2. Description of the Related Art

Many different kinds of computer hardware and software applications are used to support sales operations. For example, customer relationship management ("CRM") and sales force automation ("SFA") applications have evolved into complex data management mechanisms. CRM systems typically receive data collected from a plurality of sources, i.e., interactions with sales contacts and data from marketing services. The data are, typically, stored in a transactional database for future analysis and manipulation. SFA, typically, refers to software that operates in conjunction with CRM systems, and provides personal information management ("PIM") functionality (e.g., software to manage appointments, contacts, notes and the like).

Sales representatives in the field use CRM and SFA applications to support their sales efforts. As used herein "CRM/SFA" refers to either a CRM system, an SFA system, or both.

The rapid adoption of next generation CRM/SFA systems in the pharmaceutical industry has focused largely on selecting appropriate computer hardware and software platforms. One of the goals of a CRM/SFA system is to make sales representatives more effective at driving market share for the products they are promoting. The ability to meet sales quotas and generate income, as well as to contribute to a product gaining market share, reflects a sales representative's performance. Typically, sales operations managers focus on system implementation issues and pay less attention to understanding what factors drive sales representative performance. Even less attention is paid to understanding how to adjust the CRM/SFA environment to optimize sales representative performance. This is largely due to the complexity of the CRM/SFA environment, and the variety of measurable and immeasurable factors that comprise sales representative success.

The effectiveness of a CRM/SFA environment depends on a plurality of interrelated services, for example, CRM/SFA help desk support, hardware service support, asset management, applications administration and maintenance, database administration and data production. No system currently exists that aggregates data from these sources in order to measure the effectiveness of CRM/SFA systems.

Typically, sales representatives in the field use portable computing devices, such as laptop computers, notebook computers and personal digital assistant devices (e.g., POCKETPC, WINDOWS CE and PALM computing devices) to operate CRM/SFA systems. A sales representative has CRM/SFA software installed on the device(s), for example, to manage the sales representative's sales contacts, schedule sales calls and provide data related to a single sales call. Sales representatives are trained in the hardware and software platforms they use, and, thereafter, use their technical skills to prepare for sales calls, enter information regarding sales calls, and otherwise use the technology. Typically, the data are uploaded regularly to another device, such as a data server that supports data transmissions from many sales representatives. Known in the art as "synchronizing" (or "synching"), data are transmitted and stored in a transactional database server for future analysis in customer relationship management, manipulation and archiving.

The training of sales representatives in CRM/SFA systems is an ongoing process. Components of CRM/SFA systems are often underutilized or ignored, thereby prompting sales representatives to undergo training in the technology. Also, training is provided when new technology is introduced or changes to existing technology occur. Further, hardware and software technical support services are provided to assist sales representatives in the field. Such support is, typically, in the form of telephone "help-desk" support, but can also be provided over the Internet via one or more web pages. Information generated by technical training and support services is usually stored on separate and disparate systems from the transactional database server receiving data during synchronization, and, therefore, cannot be readily analyzed.

One vendor of CRM/SFA software applications is SIEBEL SYSTEMS, INC. (hereinafter, "SIEBEL"). SIEBEL currently provides a suite of products directed to CRM/SFA systems, including transactional and analytical software. Data received from transactional software refer to information collected by a sales representative in the field and directed to sales contacts, sales calls and the like. These data are stored in an on-line transactional database, or OLTP. Alternatively, on-line analytical processing ("OLAP") systems store the data and present the information in useful ways. With respect to the pharmaceutical industry, SIEBEL currently provides SIEBEL PHARMA, a software application that includes a suite of products including support for sales, customer service and marketing for the pharmaceutical industry.

Other software systems are known that provide analysis on data received from various sources. One system, provided by SAS and entitled ANALYTIC INTELLIGENCE, enables users to perform statistical analysis (e.g., linear regression) to generate information that provides insight into various business practices. Predictive modeling, forecasting, simulation, and optimization are also provided by SAS ANALYTIC INTELLIGENCE (see, for example, http://www.sas.com/technologies/analytics/). SIEBEL also currently provides data analysis software, SIEBEL ANALYTICS. This software platform provides analysis and warehousing for transactional data received from a transactional source system. SIEBEL ANALYTICS provides information which, in addition to the transactional data received from sales representatives in the field, is warehoused in a large database, such as provided by ORACLE CORPORATION. The data warehouse facilitates presentation of the data in graphical and contextual views.

Other software systems are known that provide the ability to extract, transform and load data from one system (typically the OLTP system) to the OLAP system. One system, provided by INFORMATICA, leverages, integrates, and transforms enterprise data from any source into the OLAP system. Of course, one skilled in the art will recognize that the extraction, transformation and loading ("ETL") process requires significant customization to ensure the data are correctly transferred and the applicable business rules are applied.

One skilled in the art will recognize that other CRM/SFA systems exist. In the pharmaceutical industry, for example, DENDRITE, STAYINFRONT, and CEGEDIM provide CRM/SFA solutions for sales forces. Also, COGNOS, MICROSTRATEGY, and BRIO SOFTWARE are examples of companies and software that provide analytical and presentation packages for data warehousing. With respect to the pharmaceutical industry, SIEBEL is a leading market share provider of CRM/SFA systems, and, accordingly, is used in many of the examples provided herein.

While the adoption of CRM/SFA systems is assumed to have led to improvements in sales representative performance, studies have shown that technology has not necessarily positively impacted performance (see "Productivity Paradox" theory as outlined in "U.S. Productivity Growth 1995–2000" by Bill Lewis, McKinsey Global Institute.) Much of the data that are provided in CRM/SFA systems are not analyzed sufficiently to lead to such improvements in productivity and effectiveness. Moreover, information from a plurality of sources, for example, learning management systems, training, support and customer surveys are not adequately aggregated and analyzed in order to explore strategies that lead to improvements. For example, learning management systems comprise on-line and classroom teaching for employees, management and the like. The support environment includes technical support (telephone, on-line and/or in person) for hardware and software applications. Further, data gathered in surveys can provide insights into the benefit technology provides with respect to sales representative performance. Unfortunately, information generated in learning management systems, technical support systems and customer feedback modules are, typically, stored in disparate and separate systems. Other information, including demographic data, attainment of quota data, sales call data, number of details data and the like can also contribute to measuring the benefits of technology with respect to sales representative performance, but are also, typically, stored in separate and disparate systems. Therefore, end-user productivity does not measurably improve by analyzing the data from these respective sources in isolation from each other.

As CRM/SFA systems are deployed and implemented, issues invariably arise from a need to explore the effects of the systems on sales force efficiency. Examples of such issues include which parties are using the system, how the system is being used, how the system drives field behavior, whether the system needs improvement (and if so, where), and what elements of the system are misunderstood, thereby requiring additional training for the sales force. In the prior art, answers to these questions are not readily available because systems do not exist that aggregate and analyze information received from the CRM/SFA system, learning management systems, support environments and customer surveys. Therefore, upper management are left wondering of the degree they are receiving benefit for the substantial investment in a CRM/SFA system, and whether the CRM/SFA system drives sales and/or improves the bottom line.

Although significant amounts of data are gathered in prior art CRM/SFA systems, management remains concerned about whether field representatives use CRM/SFA systems effectively; for example, whether actual usage of the systems reflects intended usage. In prior art, data warehousing systems built from CRM/SFA data enabled management to monitor usage based on logon or frequency of synchs. Data based on these sources may provide a proxy for CRM/SFA usage, but do not provide sufficient detail of how a system is being used. Moreover, the impact of CRM/SFA systems on sales representative performance can not be determined satisfactorily using prior art CRM/SFA systems.

Referring to the drawing figures, in which like reference numerals refer to like elements, there is shown in FIG. 1 a representation of a typical distribution of sales force performance. As shown in FIG. 1, a distribution of sales representatives indicates a top twenty percent tier who achieve their goals consistently. Sixty percent of the sales force comprise the middle tier, and represent those who do not achieve performance goals to the extent of the top twenty percent tier. Twenty percent of the sales force are in the bottom tier and achieve below the performance goals of the middle tier. Despite the deployment of CRM /SFA systems, the distribution of sales force performance remains as represented in FIG. 1.

In a typical pharmaceutical sales force, each sales representative is exclusively assigned to a specific sales territory that includes sales contacts (i.e., doctors and other health care providers). A plurality of sales territories comprise a sales district. A plurality of sales districts comprise a sales region. A sales representative is assigned to a sales territory and that representative's sales performance is measured at least in terms of the performance of other sales representatives operating in the same sales district.

Ideally, each sales representative is offered equal access to a number of sales contacts who are receptive to meeting with a sales representative and a number of contacts who are less so. The sales territories are defined such that each sales representative has an equal chance of reaching receptive (and less receptive) contacts, thereby enabling each sales representative to meet his/her sales quota requirements. In the pharmaceutical industry, for example, no single sales representative has unrestricted access to the same group of physicians who are generally receptive to sales representatives, while other sales representatives are forced to engage physicians who are unresponsive to sales representatives, in general.

SUMMARY OF THE INVENTION

The present invention relates to capturing and transferring usage data from a CRM/SFA system, data warehousing and presentation, and, more particularly, to performing dimensional modeling on data received in customer relationship management system environments and the unique application of statistical methodologies to ascertain the drivers of sales representative performance.

The present invention provides a system and method for extracting data from a plurality of sources, such as CRM/SFA related sources, integrating these data into a data warehouse and applying an analytical software component to generate useful predictive models. There is a need in the industry for a system and method to provide information leading to an explanation for the distribution of a sales force, as shown in FIG. 1, with respect to performance goals. There is further a need for a system and method to analyze a plurality of criteria, including information leading to an explanation for variable sales force performance, in order to improve sales representative performance in the field, thereby affecting the distribution of performance with respect to a sales force.

In accordance with an example embodiment of the present invention, usage capture software ("UCS") operates in the background on a user terminal 14 and captures a detailed record of a person's computer usage. For example, every screen display viewed by a sales representative operating a CRM/SFA application and other action taken by a person operating a computer is monitored and tracked. The information retrieved by the UCS is stored in a database.

In an example embodiment of the present invention, software collects usage data from the CRM/SFA software that allows companies to manage most, if not all, aspects of their relationship with a customer. When a sales representative uses CRM/SFA software to interact with a client, the UCS monitors actions taken by the sales representative. In addition to monitoring computer usage, an example embodiment of the present invention receives data from other sources, such as from technical support help desks and learning management systems. Moreover, information directed to employee performance is stored and used in an algorithm to determine the effectiveness of particular technologies and sales representative use thereof.

An example embodiment of the present invention includes a method for providing information by obtaining usage information related to a person's interaction with technology. Further, transactional information related to information collected by the technology is provided. Professional performance information that is related to the person's professional performance is obtained, and aggregation and/or segmentation is performed on at least one of the usage information, the transactional information and the professional performance information. In this way, aggregated information and/or segmented information is provided, and at least one statistical methodology is applied on the aggregated and/or segmented information to obtain statistical analysis information. Data modeling is performed on the statistical analysis information, and modeled statistical analysis information is presented.

Further, the present invention provides a system for representing an interaction between a user and a software application that comprises a configuration module that operates to receive information related to at least one portion of the software application, a configuration record module that operates to provide an indicia representing the portion(s) in a configuration data record, and a usage capture module that operates to provide the indicia from the configuration data record in a usage capture data record when the portion(s) of the software application is accessed by the user of the software application.

BRIEF DESCRIPTION OF THE DRAWING(S)

For the purposes of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIGS. 5A–5D are charts that comprise source data for variables used in data models in accordance with an example embodiment of the present invention;

FIG. 8 illustrates dimensional entities that are aggregated in the dimensional modeling process in order to provide predictive outcomes;

DETAILED DESCRIPTION OF EMBODIMENTS OF THE INVENTION

The present invention is directed to providing solutions to shortcomings identified above with respect to prior art CRM/SFA and related data warehousing systems. By implementing the system and method described herein, information that is stored in CRM/SFA environments can be leveraged to expose strengths and shortcomings in CRM/SFA system design and use, and to improve business decisions and, ultimately, sales representative performance. As described in detail herein, end-user productivity and effectiveness is accurately represented by integrating and aggregating data collected in a CRM/SFA system environment, collected in other environments, and modeling the data in accordance with dimensional data models, and presenting the data in useful ways. Sales representative productivity is further improved by measuring and maximizing the adoption of new investments in CRM/SFA systems technology. Further, the value derived from discrete components of a CRM/SFA system can be determined and increased.

Figure 1:
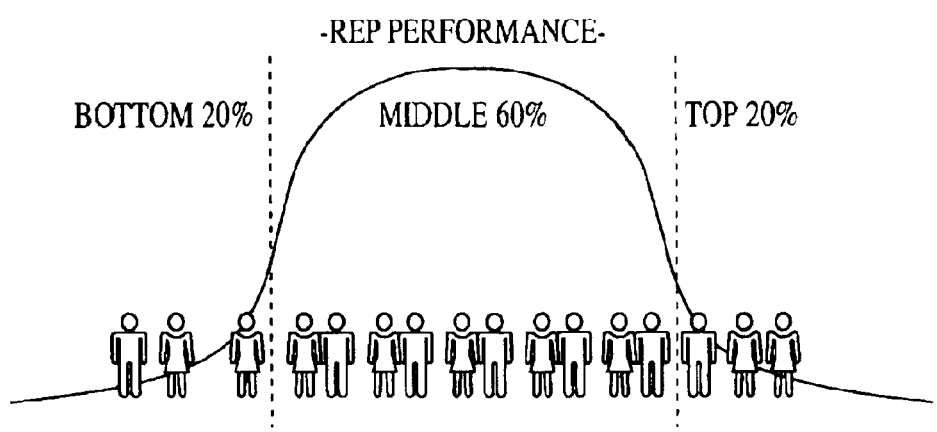
FIG. 1 shows a sample distribution of sales representative performance within a sales force.
Figure 2:
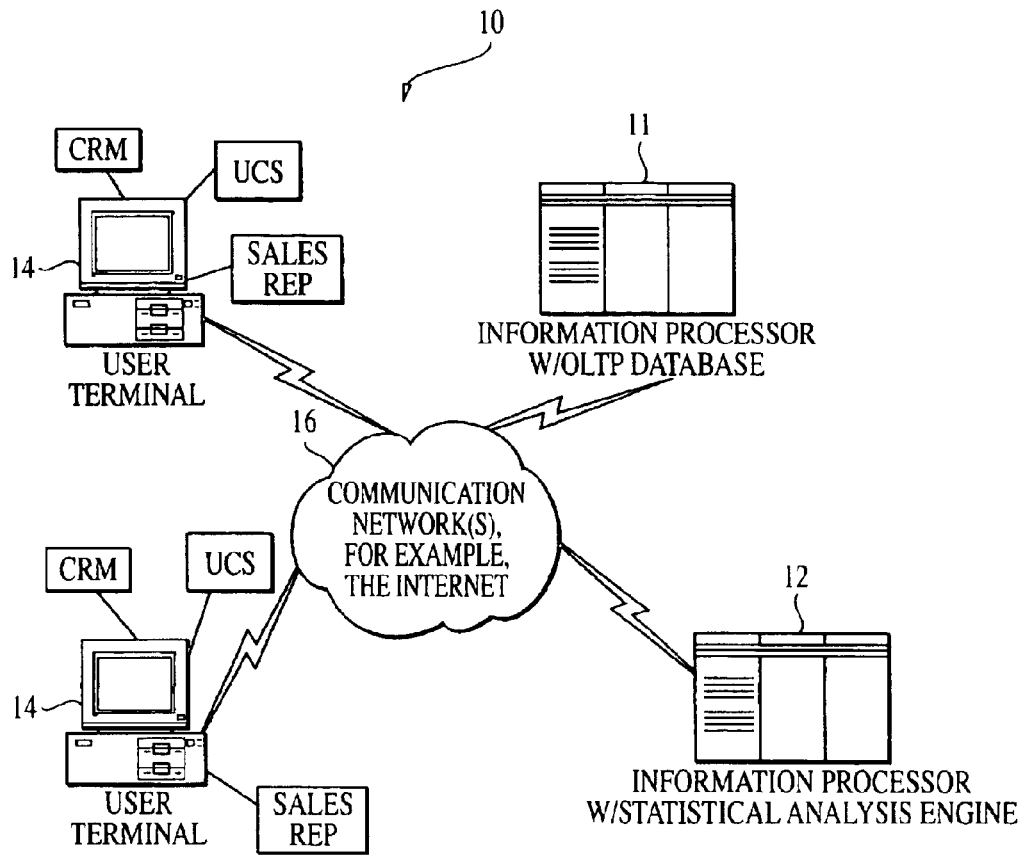
FIG. 2 shows a example arrangement of hardware and software applications in accordance with an example embodiment of the present invention.

FIG. 2 shows a first exemplary embodiment including a hardware and software arrangement for optimizing sales force performance and referred to herein, generally, as performance optimizer system 10. Performance optimizer system 10 includes at least one information processor 11 that comprises an OLTP database, at least one information processor 12 that receives OLTP information from information processor 11 and manipulates the data for warehousing, analysis and presentation, and at least one user terminal 14, each of which are capable of communications over communication network 16. Information processor 12 preferably includes all databases necessary to support the present invention. However, it is contemplated that information processor 12 can access any required database via communication 16, or any other communication network to which information processor 12 may be coupled.

As shown in FIG. 2, user terminal 14 has at least CRM/SFA software and usage capture software (described in detail below) installed and/or operating thereon. Preferably, user terminal 14 is operated by a sales representative in the field. The user terminal 14 synchs with information processor 11, and the information processor 11 transmits data to information processor 12. Information processor 12 includes but is not limited to analytical and warehousing functionality, as well as data modeling presentation capability.

Communication network 16 is preferably a global public communication network, such as the Internet, but can also be a wide area network, local area network or other network that enables two or more computing devices to communicate with each other. In an example embodiment, information processor 12 and user terminal 14 are any devices that are capable of sending and receiving data across communication network 16, for example, mainframe computers, mini computers, personal computers, laptop computers, personal digital assistants (PDA) and Internet access devices such as Web TV. In addition, user terminals 14 are preferably equipped with a web browser, such as MICROSOFT INTERNET EXPLORER, NETSCAPE NAVIGATOR, etc. Information processors 11 and 12 and user terminals 14 are coupled to communication network 16 using any known data communication networking technology.

Many of the features and elements of the present invention can be described in terms of discrete and functional units that are part of the total system and method. As used herein, the term, "module," refers, generally, to one or more discrete components that contribute to the effectiveness of the present invention. Modules can include software elements, including but not limited to functions, algorithms, classes and the like. Modules also include hardware elements, substantially as described below. Modules can operate independently or, alternatively, depend upon one or more other modules in order to function.

Figure 3:
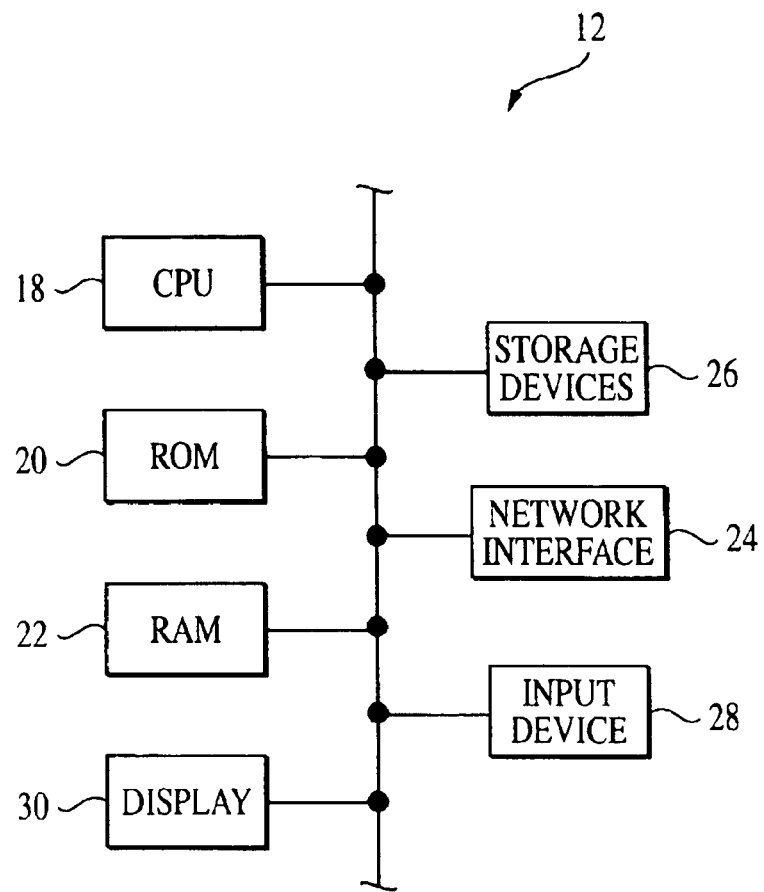
FIG. 3 is a block diagram illustrating the functional elements in an exemplary information processor.

As shown in FIG. 3, the functional elements of each information processor 12 can include one or more Central Processing Units (CPU) 18 used to execute software code and control the operation of information processor 12, Read-Only Memory (ROM) 20, Random Access Memory (RAM) 22, one or more network interfaces 24 to transmit and receive data to and from other computing devices across a communication network, storage devices 26 such as a hard disk drive, floppy disk drive, tape drive, CD ROM or DVD for storing program code, databases and application data, one or more input devices 28 such as a keyboard, mouse, track ball, microphone and the like, and a display 30.

The various components of information processor 12 need not be physically contained within the same chassis or even located in a single location. For example, storage device 26 may be located at a site which is remote from the remaining elements of information processor 12, and may even be connected to CPU 18 across communication network 16 via network interface 24. Information processors 12 can include a memory equipped with sufficient storage to provide the necessary databases and services, for example, acting as a web server for communicating Hypertext Mark-Up Language (HTML), JAVA applications and applets, ACTIVE-X control programs, XML programs, and the like to user terminals 14. Information processors 12 are arranged with components, for example, as shown in FIG. 3, suitable for the expected operating environment of information processor 12. The CPU(s) 18, network interface(s) 24 and memory and storage devices are selected to ensure that capacities are arranged to accommodate expected demand.

As used herein, the term "link" refers to a selectable connection from one or more words, pictures or other information objects to others in which the selectable connection is presented within the web browser. The information object can include sound and/or motion video. Selection is typically made by "clicking" on the link using an input device such as a mouse, track ball, touch screen and the like. Of course, one of ordinary skill in the art will appreciate that any method by which an object presented on the screen can be selected is sufficient. The functional elements in FIG. 3, designated by reference numerals 18–30, are the same categories of functional elements present in user terminals 14. However, not all elements need be present. For example, storage devices in the case of PDAs and the capacities of the various elements are arranged to accommodate the expected user demand. For example, CPU 18 and user terminal 14 may be a smaller capacity CPU than the CPU present in the information processor 12. Similarly, it is likely that the information processor 12 will include storage devices of a much higher capacity than storage devices present in user terminal 14.

Of course, one of ordinary skill in the art will understand that the capabilities of the functional elements can be adjusted as needed. The nature of the invention is such that one skilled in the art of writing computer executable code (i.e., software) can implement the described functions using one or more of a combination of popular computer programming languages and developing environments including but not limited to C, C++, VISUAL BASIC, JAVA, HTML and web application development environments.

Although the present invention is described by way of example herein and in terms of a web-based system, performance optimizer system 10 is not limited to the above configuration. It is contemplated that performance optimizer system 10 is arranged such that user terminals 14 can communicate with and display data received from information processors 12 using any known communication and display method, for example, using a non-Internet browser WINDOWS viewer coupled with a local area networked protocol such as the Internet Packet Exchange (IPX), dial-up, third-party, private network or a value-added network (VAN).

It is further contemplated that any suitable operating system can be used on client system 14, for example DOS, WINDOWS 3.X, WINDOWS 95, WINDOWS 98, WINDOWS NT, WINDOWS 2000, WINDOWS ME, WINDOWS CE, WINDOWS XP, MAC OS, UNIX, LINUX, PALM OS, POCKET PC, and any other suitable operating system.

As used herein, references to displaying data on user terminal 14 refer to the process of communicating data to the terminal across communication network 16 and processing the data such that the data are viewed on the terminal displays 30, for example, by using a web browser or the like. As is common with web browsing software, the display screen on user terminals 14 present sites within the network system 10 such that a user can proceed from site to site within the system by selecting a desired link. The display screens on user terminals 14 present areas within performance optimizer system 10 such that a user can proceed from area to area within the system by selecting a desired link. Therefore, each user's experience with performance optimizer system 10 is based on the order with which they progress through the display screens.

Graphic controls are available in the display screens and modules to initiate data processes, and to provide convenient navigation between the display screens and modules of performance optimizer system 10. In other words, because the system is not completely hierarchical in its arrangement of display screens, users can proceed from area to area without the need to "back track" through a series of display screens. For that reason, the following discussion is not intended to limit the present invention to a sequential operation of steps, but rather to illustrate the components of performance optimizer system 10.

In accordance with an example embodiment of the present invention, an analytical software engine receives information from a plurality of sources, including but not limited to end-user support systems, a CRM/SFA transactional system, and one or more learning management systems. The information received from these sources contribute to a profile of individual sales representatives who use a CRM/SFA system. Other examples of data received by the analytical engine include but are not limited to IT usage, training records, promotional efforts (e.g., sales calls, free samples, sales events and the like), sales representative performance (e.g., attainment of sales quotas), and customer survey information such as numeric values assigned to degrees of customer satisfaction. The analytical software engine preferably analyzes the different metrics and creates reports that provide insight into the potential relationships between operational metrics and sales representative performance. The reports are leveraged to make operational and business recommendations with respect to IT deployment and sales representative training.

A CRM/SFA system deployed environment is optimized and adopted in order to improve sales representative performance and, ultimately, the bottom line. This is accomplished, in part, by graphically representing which sales representatives use CRM/SFA technology, whether actual usage conforms with intended usage, and whether a difference exists in the adoption and usage between top and bottom performance tiers of sales representative. By analyzing the relative impact each CRM/SFA technology component (e.g., CRM/SFA usage, technical support, training, and customer feedback) has on sales representative performance, strategies for controlling such components to improve sales representative performance are provided.

Figure 4:
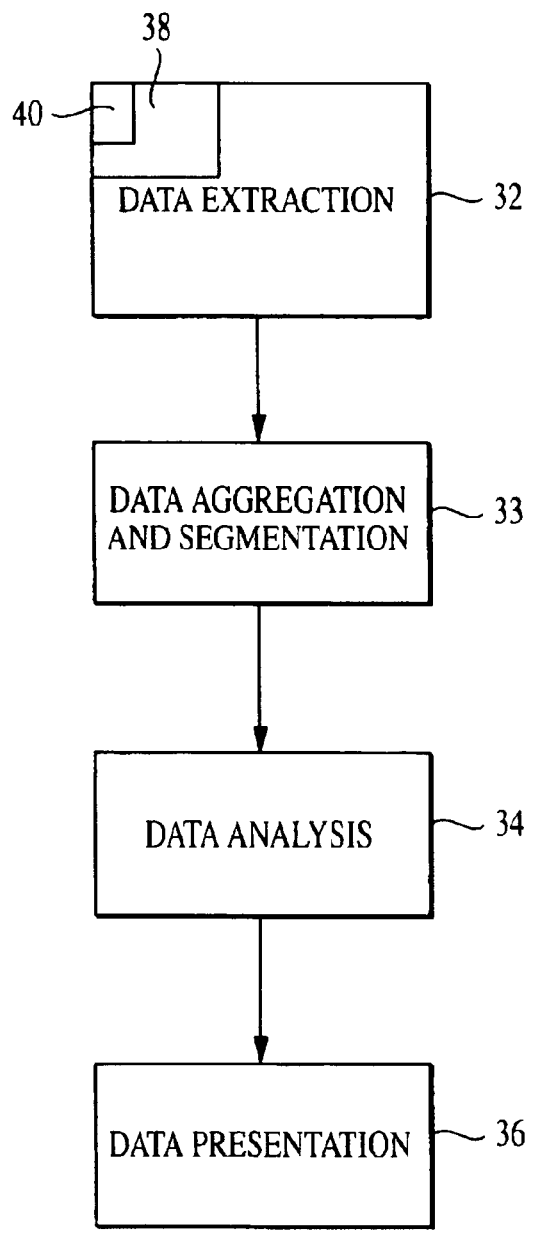
FIG. 4 is a block diagram that illustrates a high-level view of processes in accordance with an example embodiment of the present invention.

In accordance with an example embodiment of the present invention, four processes interact to provide much of the functionality described herein. FIG. 4 shows a black box diagram that represents data extraction 32, data aggregation and segmentation 33, data analysis 34, and data presentation 36. Data extraction 32 regards receiving data from sales representatives in the field and the transactional systems that support them. Such data include transactional information from CRM/SFA systems and usage information captured in accordance with an example embodiment of the present invention. Other sources of data, such as from Human Resources departments, help-desk databases and learning management systems, are received by the present invention. Data aggregation and segmentation 33 include de-normalizing data, organizing data, aggregating data and placing the results in a dimensional model. Data analysis 34 includes applying statistical algorithms (e.g., linear regression algorithms) on the warehoused data for predictive modeling. Moreover, data from various sources, such as transactional databases, sales representative performance databases, help-desk support systems and the like are preferably updated regularly. Furthermore, statistical algorithms are regularly performed on existing and/or updated data to ensure that predictive models provide up to date representations.

Figure 4A:
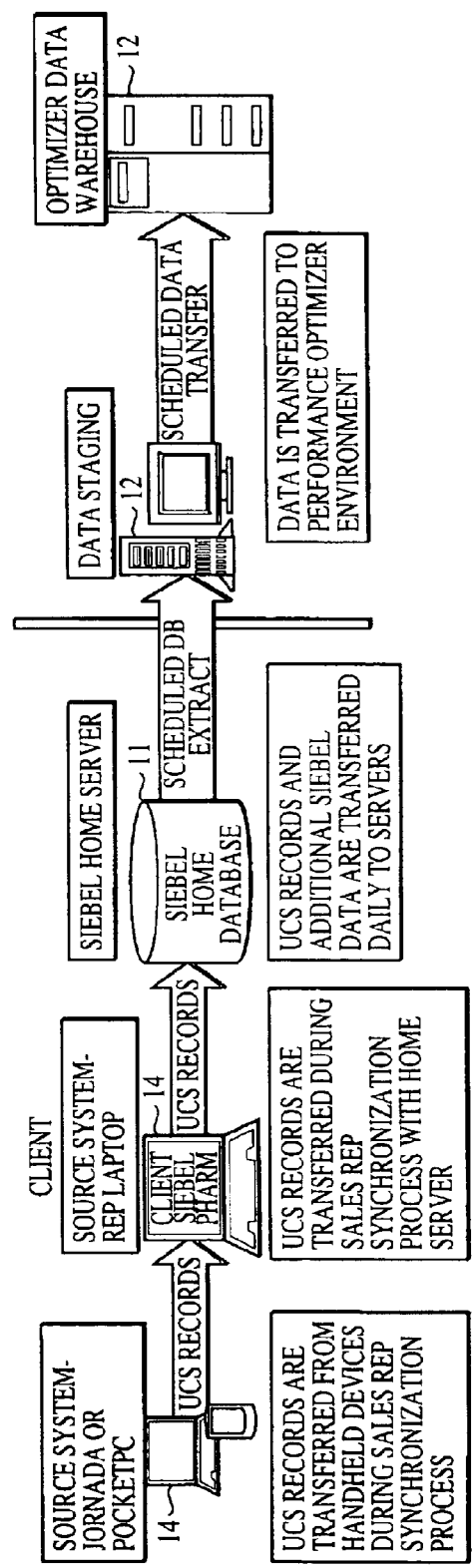
FIG. 4A is a diagram illustrating devices used in accordance with the processes shown in FIG. 4.

FIG. 4A is a diagram that illustrates devices used in accordance with the processes of FIG. 4. As shown in FIG. 4A, user terminals 14 comprise a plurality of devices, including PDA's and laptop computer systems. From the user terminals 14, data are preferably transferred to information processor 11 (shown as an example SIEBEL Home Server). The data from information processor 11 are preferably extracted and transferred to information processor 12 for data staging and storage in a data warehouse.

Dimensional modeling is a database design technique that enables the presentation of large amounts of data in intuitive ways. This involves the design of Star schemas, involving a single "fact" table and a plurality of "dimension" tables. Fact tables comprise "measures" and "foreign keys" to applicable Dimension tables; the combination of Dimension Keys sets the grain of these measures across Dimensions. Reporting tools, query tools and GUIs that are preferably applied to graphically present the model in a web browser display screen. Typically, data extraction 32, data analysis 34, data aggregation and segmentation 33, and data presentation 36 operate in a sequential order, wherein data are first extracted for purposes of analysis and presentation.

Figure 5:
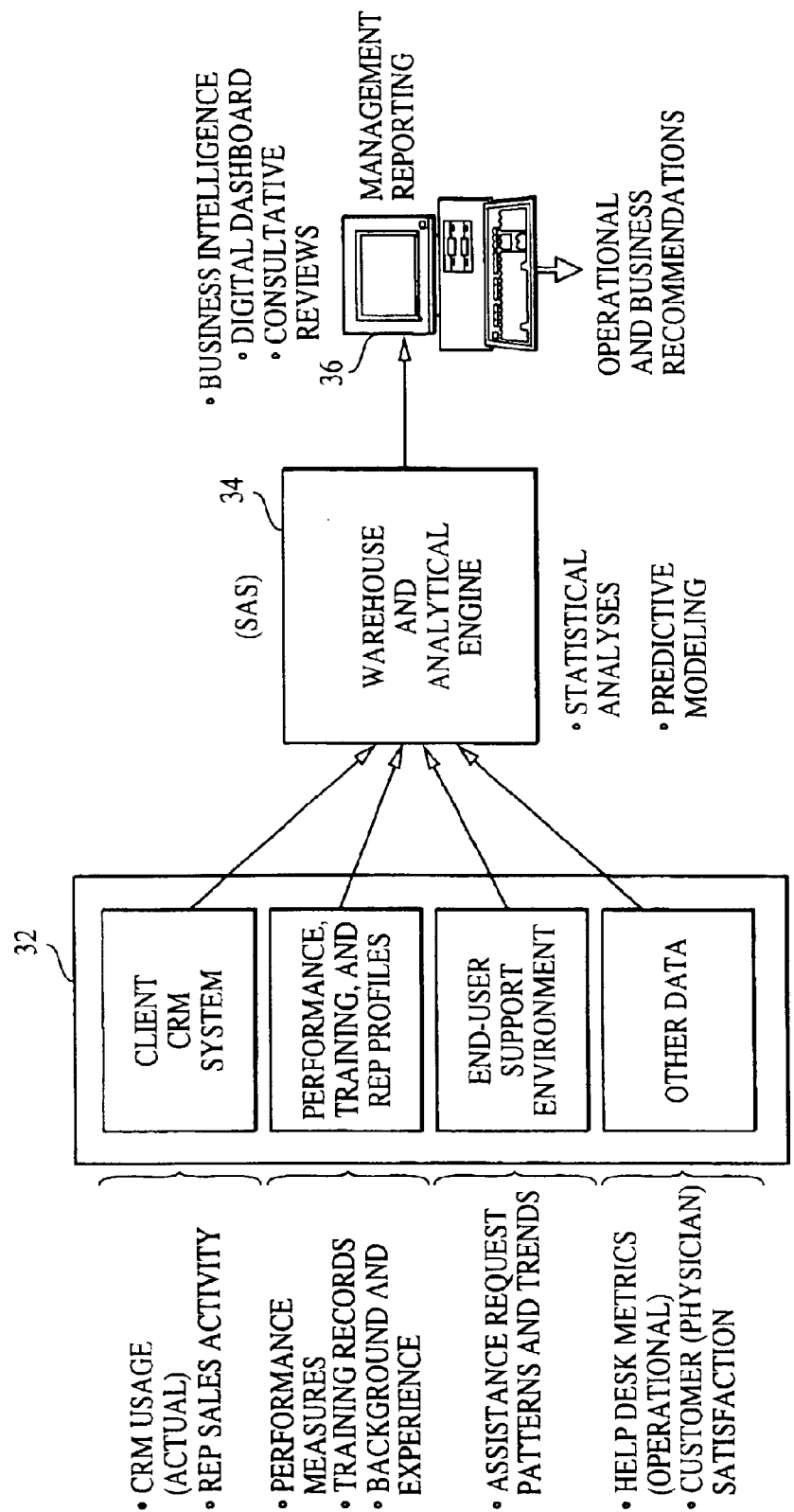
FIG. 5 is a diagram that illustrates in greater detail the processes illustrated in FIG. 4.
Figure 6A:
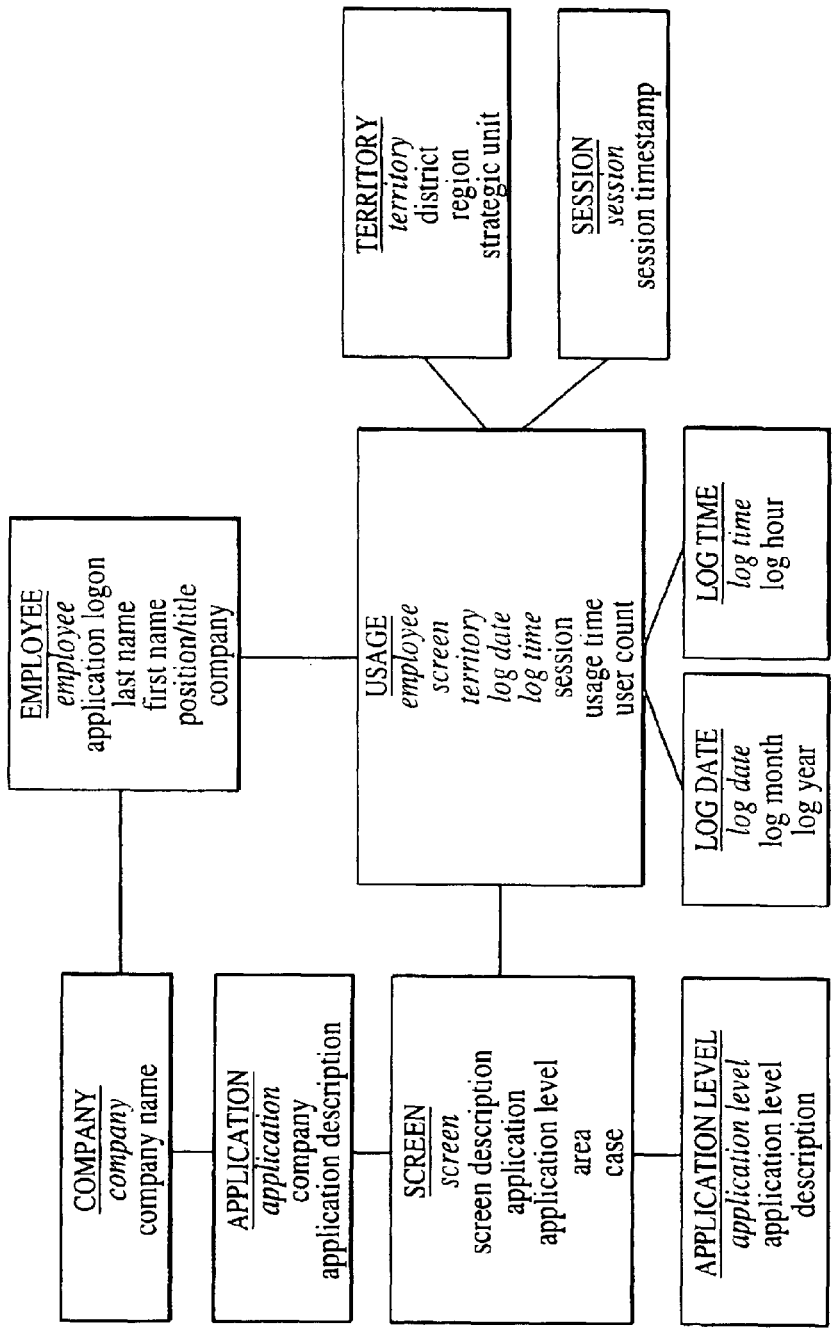
FIGS. 6A–6I are a series of representations of data joins for fact and dimension tables in accordance with an example embodiment of the present invention.
Figure 6B:
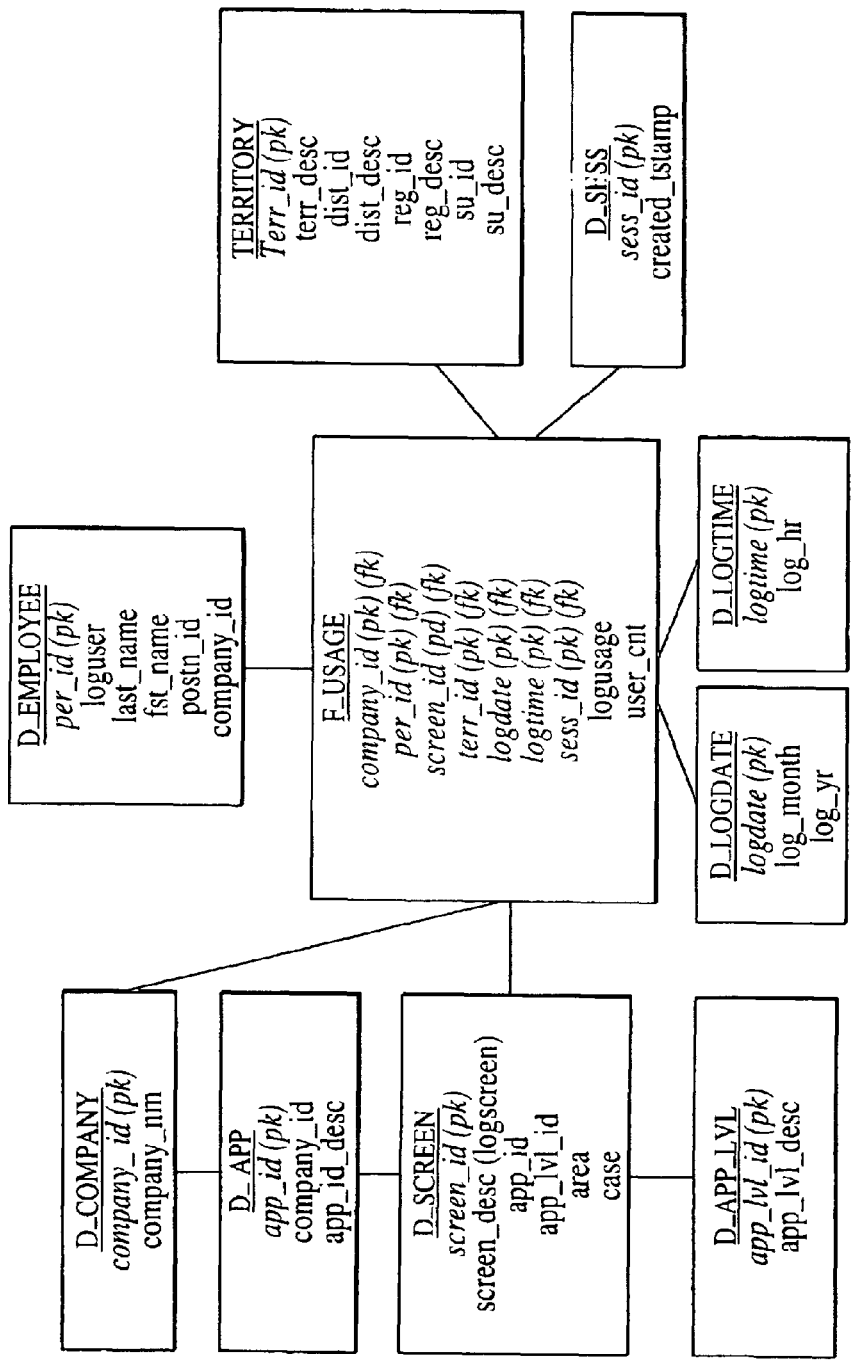
Figure 6C:
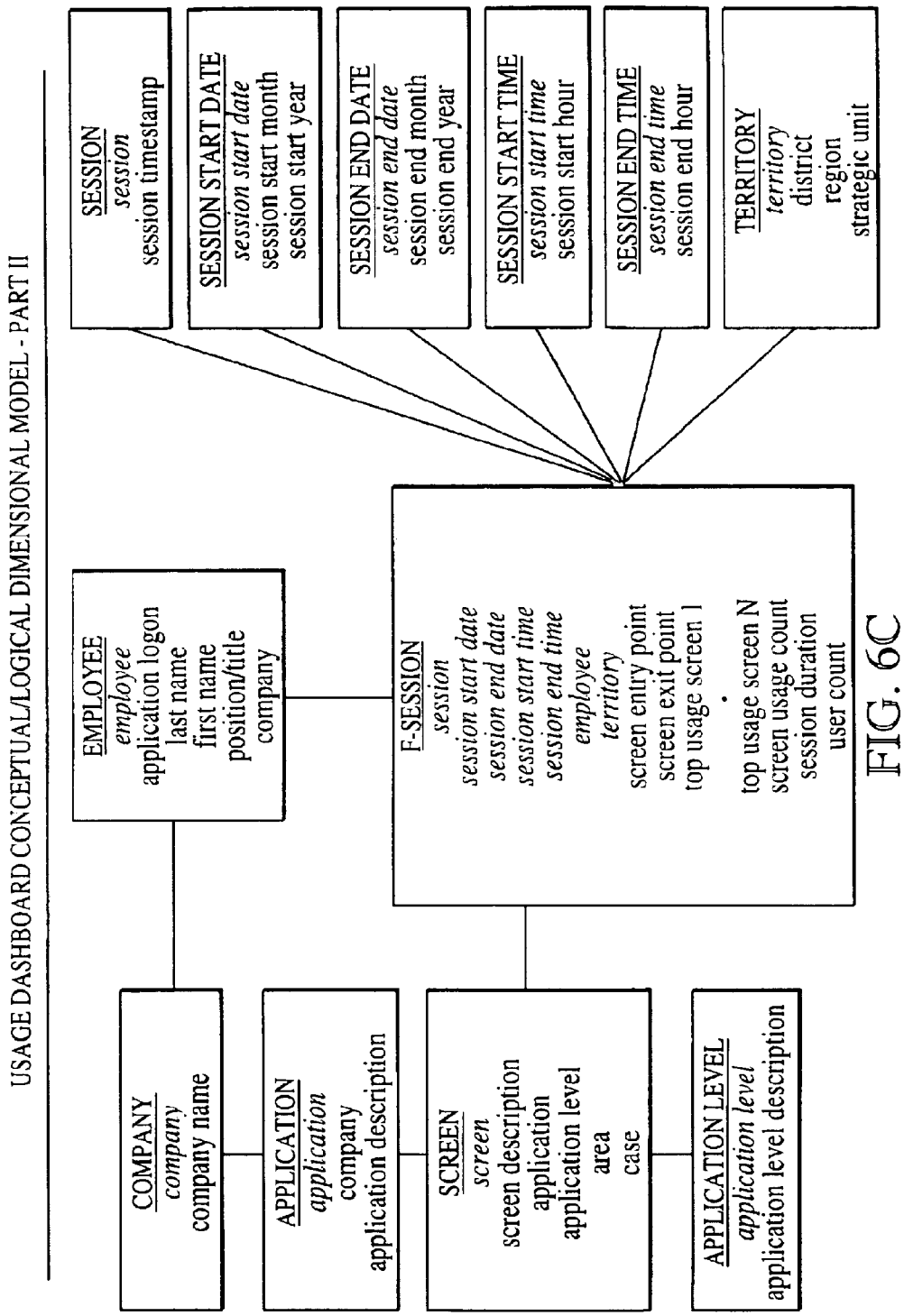
Figure 6D:
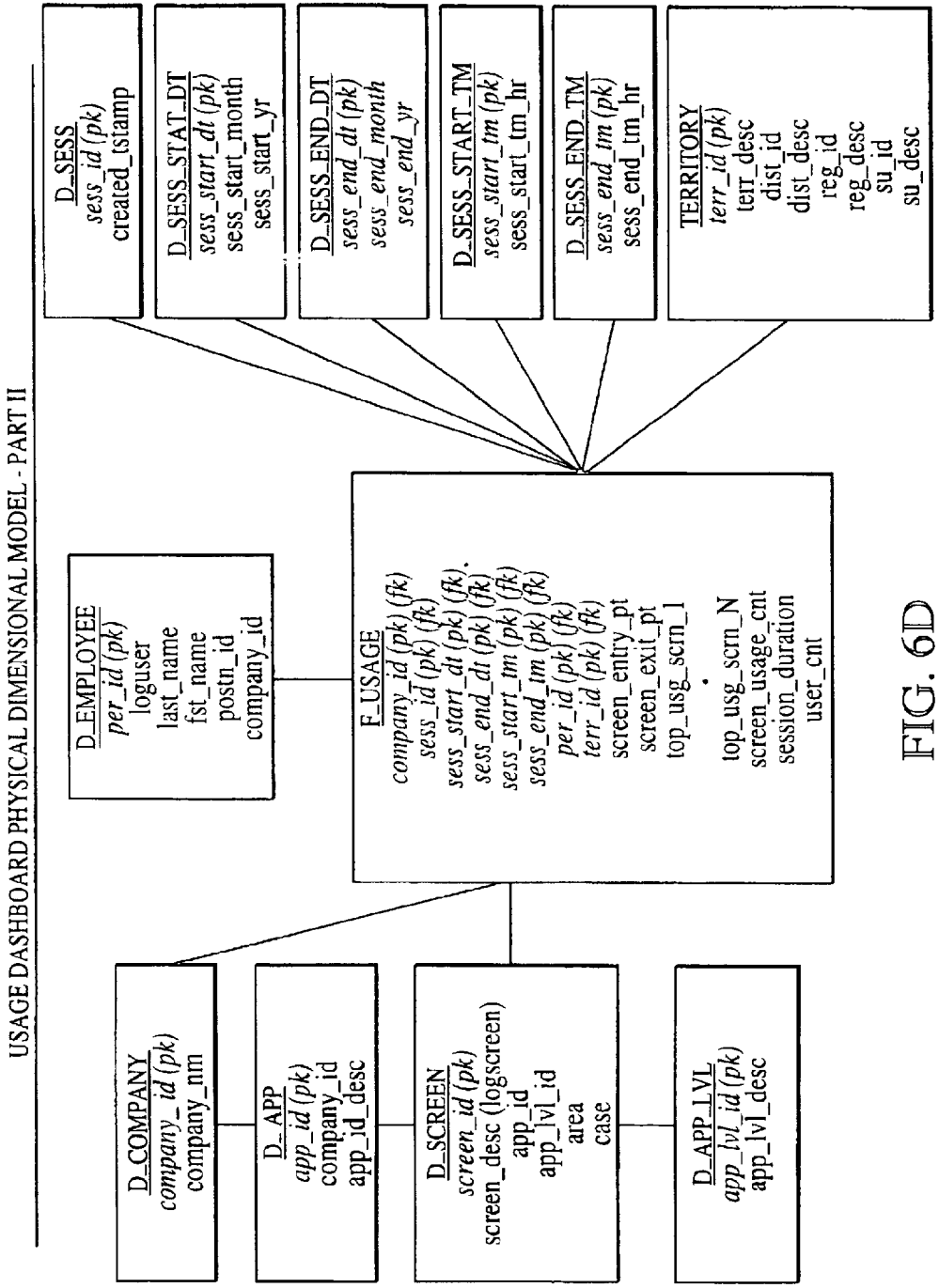
Figure 6E:
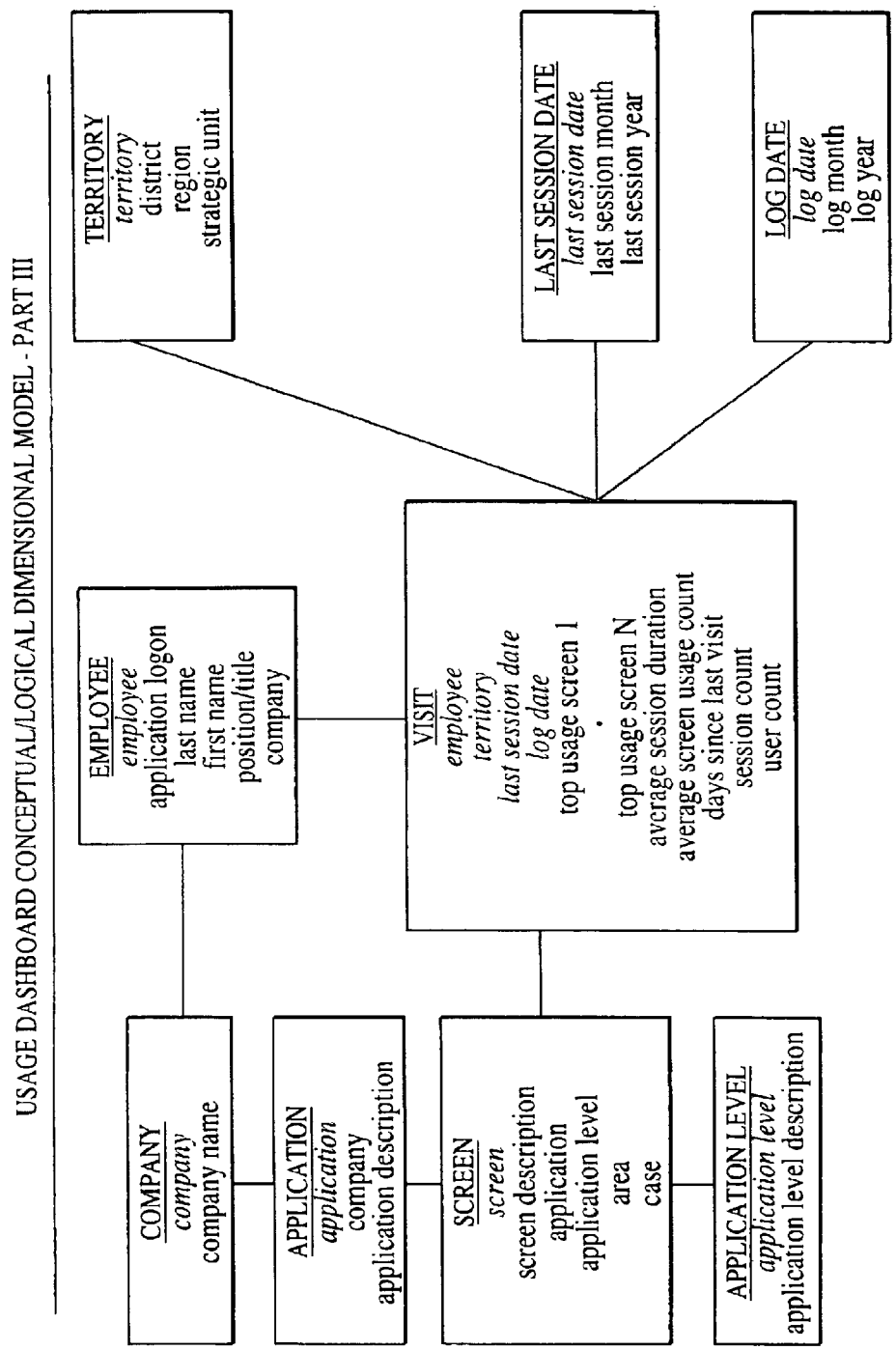
Figure 6F:
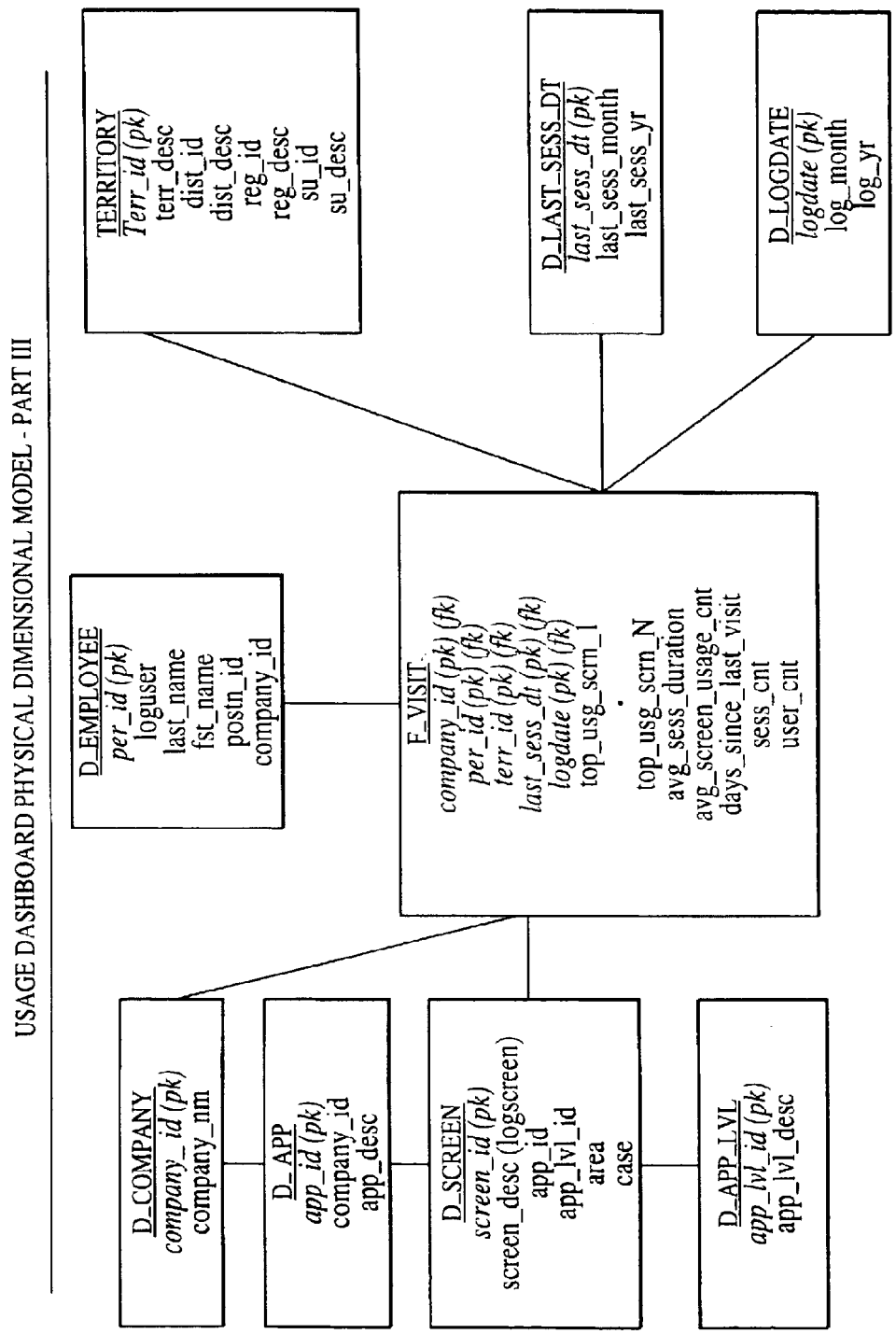
Figure 6G:
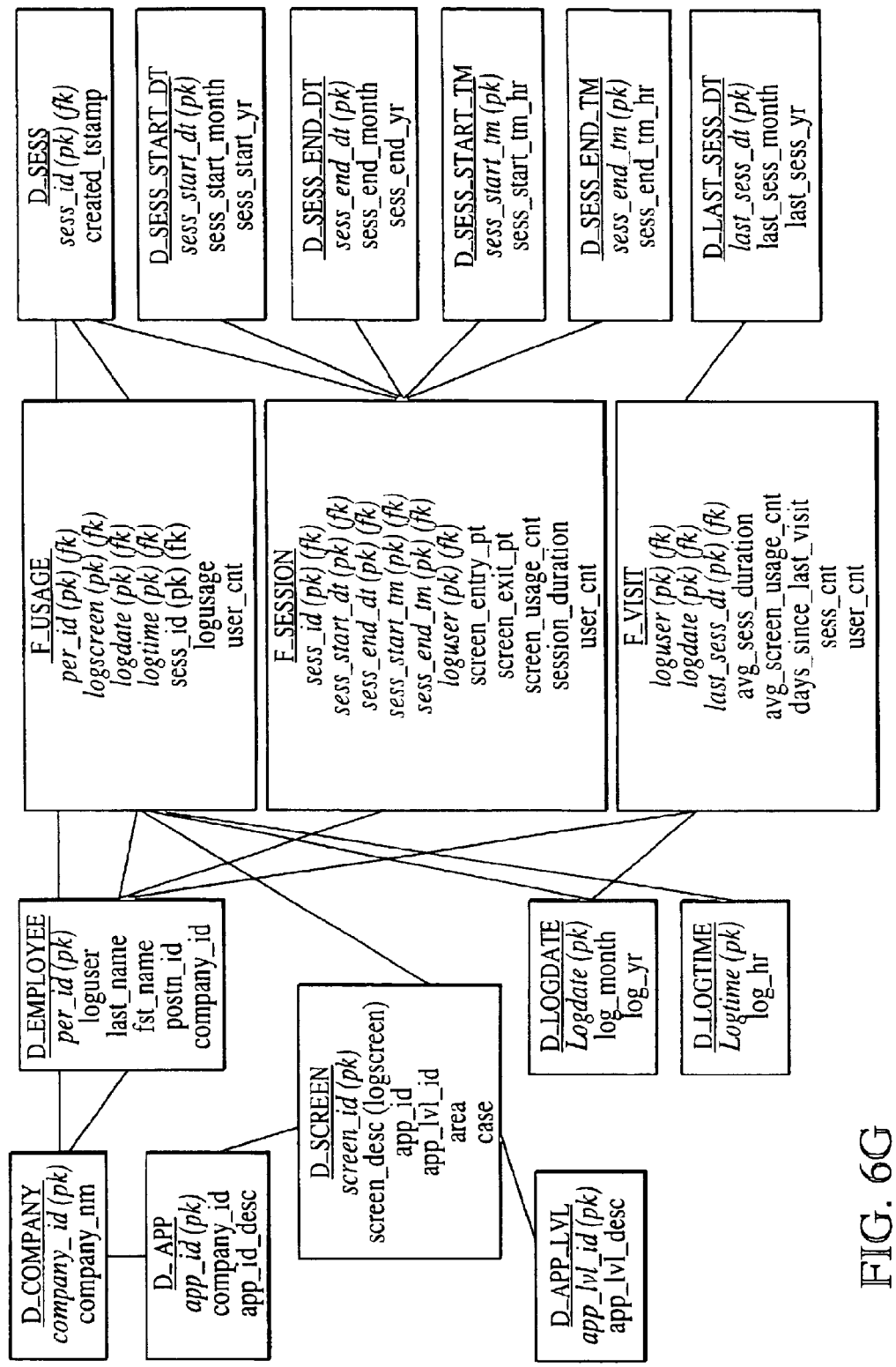
Figure 6H:
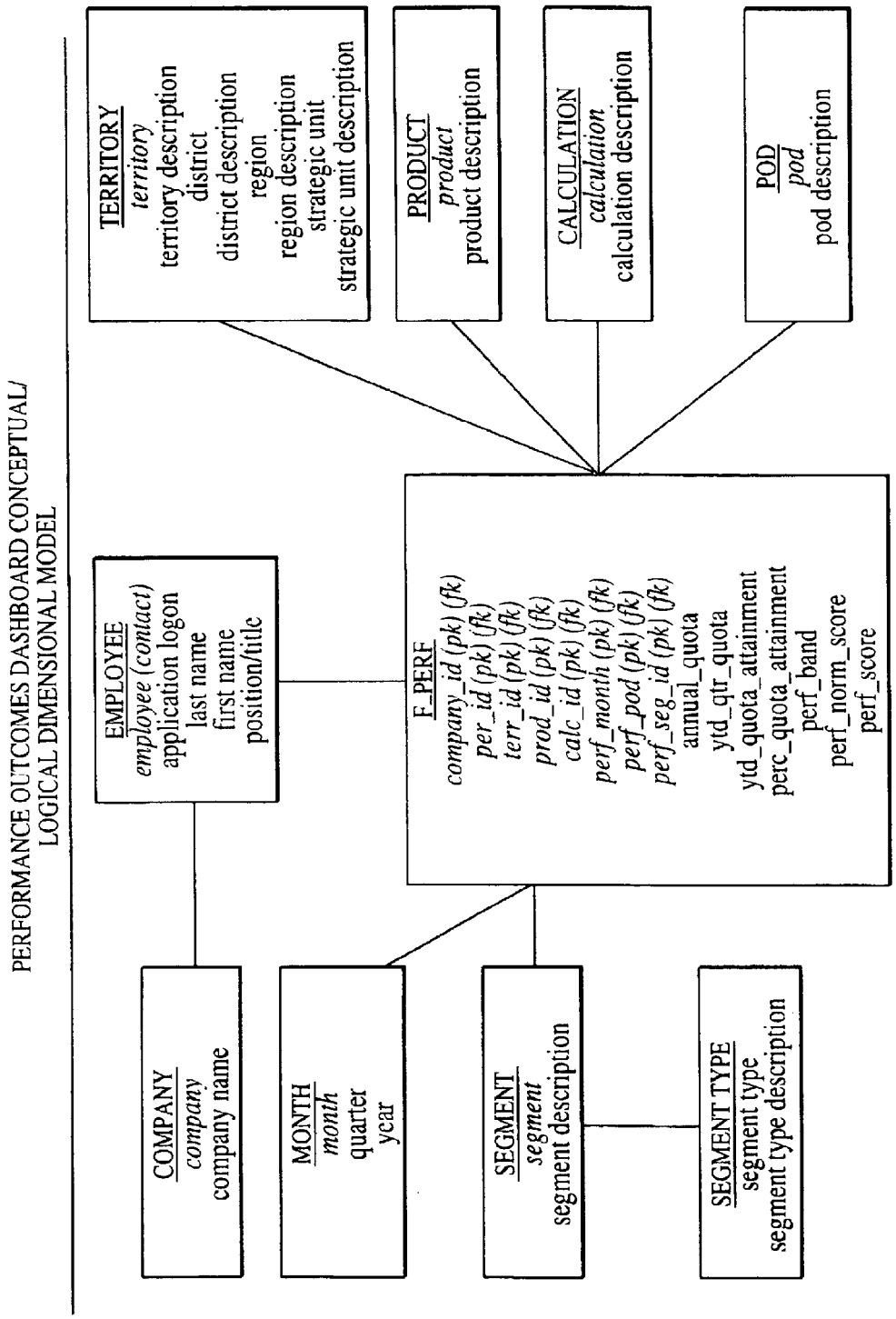
Figure 6I:
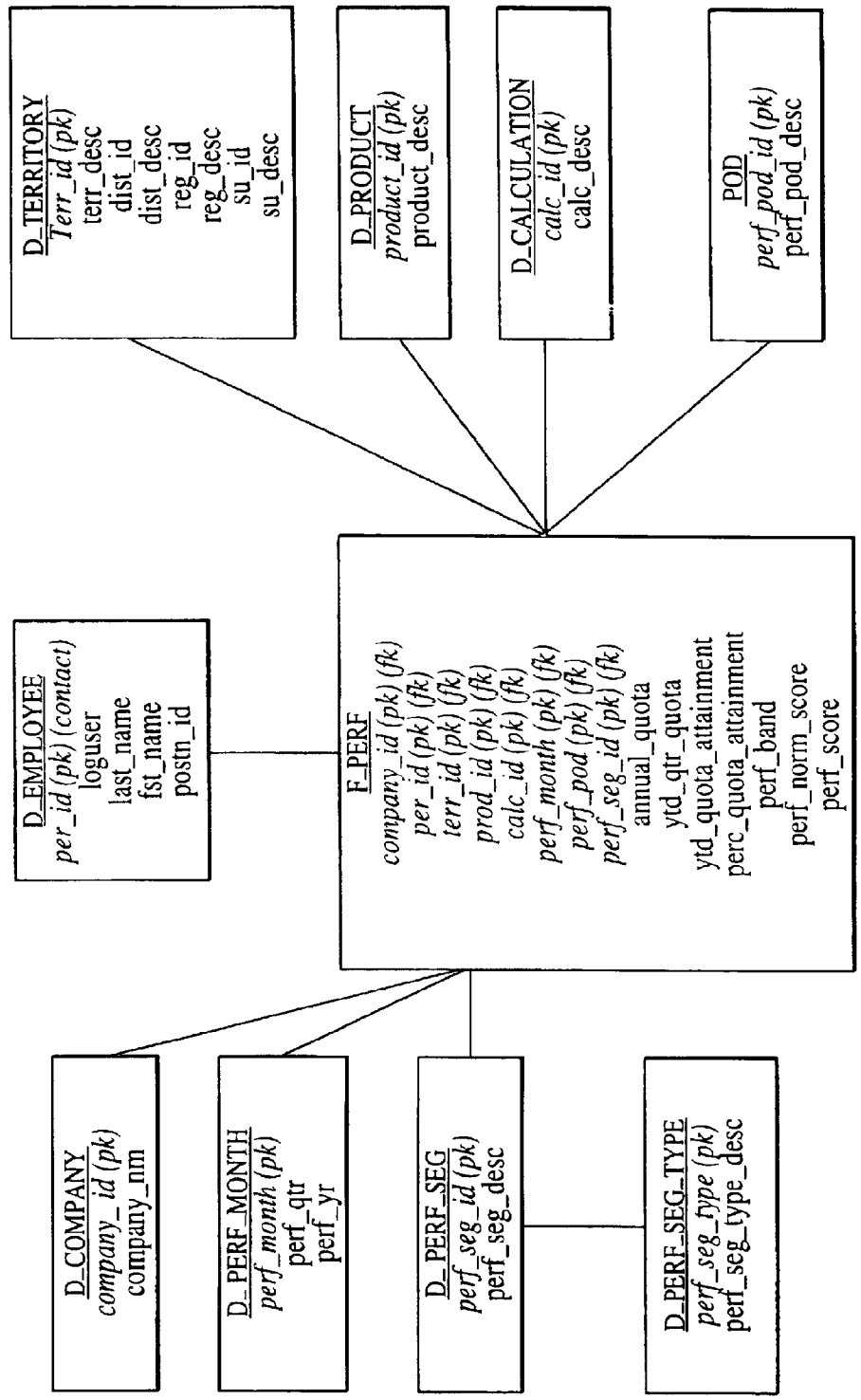

FIG. 5 is a diagram that illustrates in greater detail data extraction 32, data analysis 34 and data presentation 36.

In accordance with an example embodiment of the present invention, usage capture software (UCS) 38 (FIG. 4) operates in conjunction with a CRM/SFA system and functions to collect usage information generated by the CRM/SFA system. In a preferred environment of the present invention, SIEBEL PHARMA is used for the CRM/SFA systems application, and UCS 38 is installed on each user terminal 14 operating the CRM/SFA systems application. Of course, one skilled in the art will recognize that SIEBEL PHARMA is but one of the various CRM/SFA systems (listed above) that are in use by sales forces (pharmaceutical-oriented or otherwise).

Preferably, UCS 38 operates to monitor computing activity and to generate data records that represent sales representative usage of CRM/SFA system. Initially, UCS 38 is preferably configured to monitor for specific events, including a user's viewing a particular display screen, that are to be captured and reported. Upon recognizing that an event has occurred, a data record is generated that represents the event. Examples of events to be monitored include the viewing of a particular display screen, the execution of a particular query, or the accessing of embedded sales reports.

Further, information corresponding to specific software operational events are preferably tracked and reported by UCS 38. For example, details are preferably provided that identify the length of time a particular display screen has been viewed, the amount of time a sales representative has expended using a CRF/SFA system component, recipient names of on-line transmissions, and the names of visited web sites or other on-line resources that are visited by a sales representative. Such kinds of information are important for data analysis 34 (i.e., in a SAS and/or SIEBEL ANALTICS environment) to provide predictive and summary information, including simulation, optimization models, and useful graphic representations of the data. Preferably, the present invention accurately captures information regarding CRM/SFA system usage.

In an example embodiment of the present invention, UCS 38 operates unbeknownst to the computer user (i.e., "in the background") and functions to recognize specific user activity and generate a record of that activity during an active user session. UCS 38 preferably monitors and stores predetermined CRM/SFA activity, including, for example, a sales representative navigating to a specific display screen, running of queries and reports, and the like. Preferably, UCS 38 creates a compressed audit data file that has encryption techniques applied thereto. As described below, UCS 38 functions to provide coded information that represents usage information, such as a sales representative's viewing of particular display screens. Preferably, two character alphanumeric codes are used to provide such usage information.

Advantageously, UCS 38 is designed to have little to no effect on CRM./SFA system performance because UCS 38 has its own dynamic link library file ("DLL") and runs in its own memory area. Therefore, UCS 38 does not compete directly with the CRM/SFA software for system resources that would otherwise negatively impact system performance.

As noted above, UCS 38 is preferably configured to monitor a plurality of usage events. Preferably, a graphic user interface ("GUI") 40 (FIG. 4) is provided to assist with configuring UCS 38. Users are able, via GUI 40, to identify and report usage information useful for tracking a sales representative's operation of the CRM/SFA system. The configuration process preferably involves invoking the GUI and making selections to identify specific data entry display screens, controls, reports and/or choices for tracking. A "signature file" is preferably created that includes textual representations of those portions of the CRM/SFA system that are identified by the user operating the GUI, and a numeric code that represents each identified portion. When the user completes selecting portions of the CRM/SFA system and assigning numeric codes thereto, UCS 38 is configured and ready to operate in the background of a CRM/SFA session.

In order to maintain system performance, only a single byte is used to represent a respective portion of a CRM/SFA system. Thus, for example, the decimal value 10 (a two character, alphanumeric code) is provided in hexadecimal format as a single byte (i.e., hex value OAH) and represents a CRM/SFA system display screen for scheduling a follow up with a contact after a sales call. When information processor 12 receives the data file provided by the sales representative, the signature file is preferably referenced to decode the hex value OAH.

While a sales representative operates the CRM/SFA system, UCS 38 preferably operates in the background and monitors display screens and portions of the CRM/SFA the sales representative is accessing. In an example embodiment of the present invention, the event of each display screen being viewed by a sales representative is captured by UCS 38, and the signature file is referenced to determine whether the event represents a sales representative's access of a portion of the CRM/SFA that has been identified for tracking. Continuing with the foregoing example, when the sales representative navigates to the display screen for scheduling a follow up with a contact, UCS 38 preferably captures the event and proceeds, as a function of the entry in the signature file, to track the representative's CRM/SFA system usage while the representative is actively viewing the display screen. Preferably, UCS 38 writes a data record that includes the byte value (OAH) representing the CRM/SFA system display screen for scheduling a follow up with a contact after a sales call, and the time when the display screen was viewed. When the sales representative navigates to another display screen, UCS 38 preferably captures the event and provides the time when the display screen represented by byte OAH was exited in the data file. In this example, the record written by UCS 38 includes the duration of time, preferably measured to the second, that the sales representative viewed the display screen.

As noted above, users of a CRM/SFA system typically synch their user terminals 14 with an information processor 11 in order to upload data they enter. In accordance with an example embodiment of the present invention, the synching process is defined to substantially automatically upload the data provided by UCS 38 to an information processor 11. Preferably, the data are compressed and encrypted, for example, by using key-based algorithms and block and stream ciphers, for efficient and secure transmission thereof. The data are transmitted to information processor 12, and are decrypted and the information is extracted for analysis and manipulation, as described in detail below. For example, the hexadecimal values are translated to a long data type, and a corresponding signature file created during UCS 38 setup and configuration is used by information processor 12 to decipher the data file and determine the sales representative's usage.

With respect to system performance, the table below represents performance test results that were measured for response times directed to the synching process and using SIEBEL PHARMA version 6.3 and UCS 38. Tests were conducted to determine a time impact of UCS 38 records running on an IBM ThinkPad laptop computer. As can be seen from the table below, the performance impact imposed by UCS 38 is extremely minimal.

| | | | |
|---|---|---|---|
| SIEBEL PHARMA Sales 6.3 launch | N/A | 2.21 seconds | 2.22 seconds |
| Duration of synchronization | 1 session, 17 minutes, 15 views | 4.23 seconds | 4.25 seconds |
| Duration of synchronization | 3 session, 48.5 minutes, 39 views | 4.38 seconds | 4.44 seconds |
| Duration of synchronization | 10 sessions, 164 minutes, 132 views | 11.82 seconds | 11.97 seconds |
| Siebel Pharma Sales 6.3 exit | 10 session, 164 minutes, 132 views | 4.90 seconds | 4.93 seconds |

Thus, UCS 38 efficiently tracks a sales representative's usage of a CRM/SFA system.

With respect to data aggregation and segmentation, in accordance with an example embodiment of the present invention, the data received from UCS 38 are transmitted from information processor 11. The data are then transmitted to information processor 12, and then analyzed with other data sources, such as sales representative performance data, learning systems data, tenure data, and interactions with the support environment. Data are received, for example, from technical support sources, demographic data sources, sales representative performance data sources, sales contact data sources and are received from a plurality of systems and stored in the data warehouse.

The data that are received from information processor 11 and various other sources are not, typically, formatted and structured for meaningful use. Therefore, information processor 12 preferably de-normalizes and/or aggregates the data via one or more processing steps. For example, data are mapped to specific business practices and to specific sales representatives. Those skilled in the art will recognize the complexities of de-normalizing and aggregating data from a plurality of disparate data sources. The present invention preferably performs de-normalizing routines on data using known processes.

More particularly, data "inputs" are preferably transmitted to information processor 12 from a plurality of sources related to the CRM/SFA system for analysis. For example and as shown in FIG. 5, usage data received from UCS 38, transactional data received from sales representatives in the field, training records, sales representative background and experience data, technical assistance request data, help desk operational metrics, and customer feedback data are aggregated and segmented.

The aggregated and segmented UCS 38 data, transactional data, and data received from third party applications are preferably incorporated into a data model. Further, data related to technical support services provided to sales representatives in the field, intra-company and inter-company comparisons, and computer telephone integration (CTI) and PBX routing cycle times are represented in the data model. Such information includes how well technical support calls are routed, the amount time required to receive an answer to a support question, and the like.

Inventory data sources and integration points are provided that define how sales representative performance can be measured in terms of dependent variables. By receiving data generated by CRM/SFA usage and transactions, learning systems, and customer support, a data model is preferably developed, as described below.

With respect to data modeling, in accordance with an example embodiment of the present invention, a physical and a conceptual and/or logical data model are provided so that analysis can be performed. FIGS. 5A–5D include charts that illustrate sample independent and dependent variables for use in predictive models and analytical reports. Preferably, a model is constructed for each dependent variable. In addition, analytical reports are built that provide in-depth views of the dependent variables.

Figure 7:
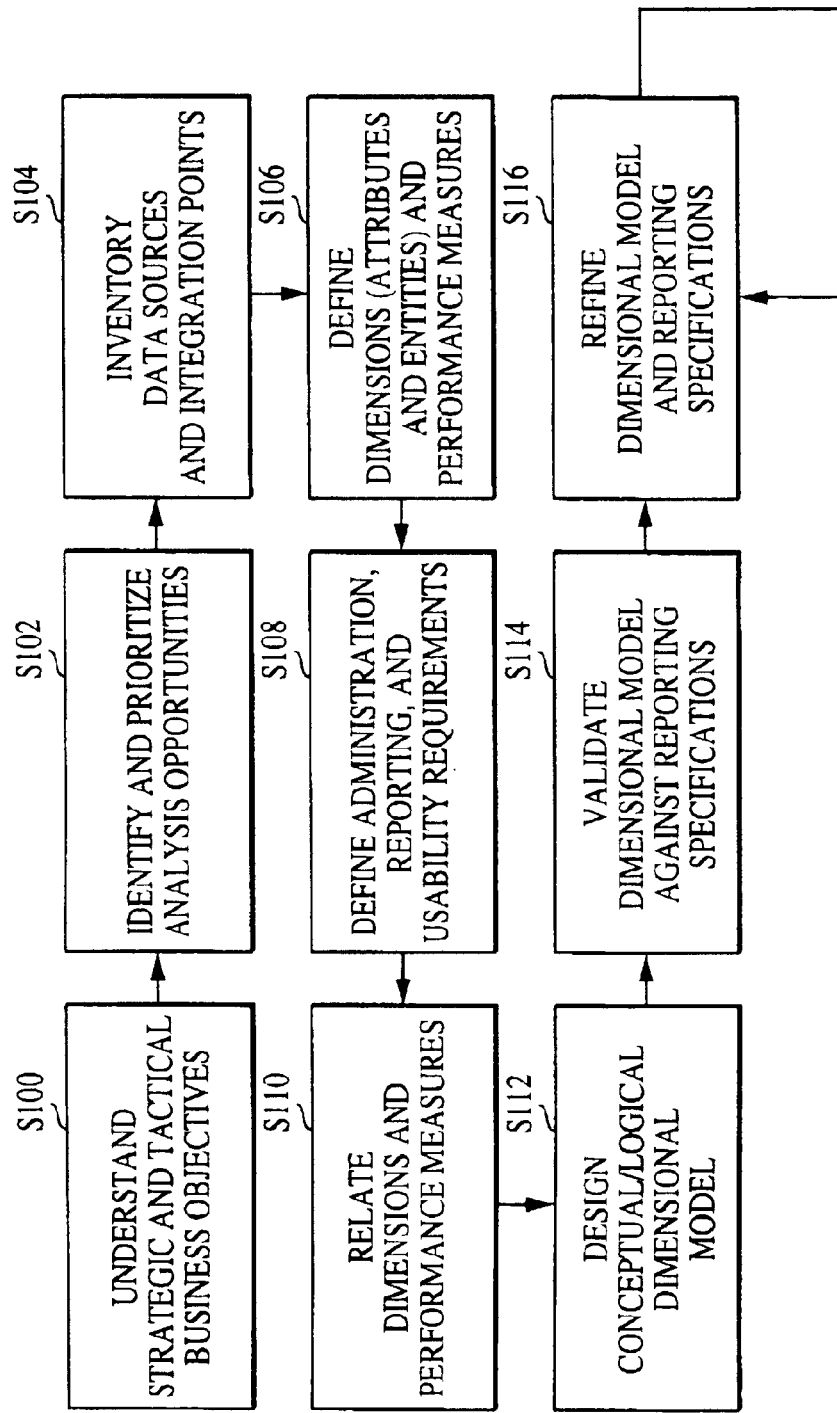
FIG. 7 is a flow chart diagram that illustrates strategies for the process of dimensional modeling in accordance with an example embodiment of the present invention.

FIG. 7 is a flow chart diagram that illustrates strategies for the process of dimensional modeling in accordance with an example embodiment of the present invention. In steps S100 and S102, a plurality of data sources are provided in order to understand strategic and tactical business objectives, and to identify and prioritize analysis opportunities. In step S104, inventory data sources and integration points are provided that define how sales representative performance can be measured in terms of dependent variables. By receiving data generated by CRM/SFA usage and transactions, learning systems, and customer support, estimates of the degrees in which factors significantly effect a sales representative's performance can be developed.

Dimensional modeling includes a design technique which involves careful arrangement of Fact and Dimension tables into Star schemas. Facts hold measures of concern to business analysts (e.g. "Percentage of Quota Attained"); these facts can be "sliced" for analysis across any supported combination of Dimensions (Time Division, Product, etc.). FIGS. 6A–6I are a series of logical and physical representations of Star schemas in accordance with an example embodiment of the present invention. The logical design includes "Snowflake" Dimensions that have been partially normalized to clearly delineate hierarchical relationships within a single Dimension table. Snowflakes are used to model complicated relationships and, if implemented in the physical model, use available data storage more efficiently than an equivalent de-normalized dimension. Of course, those skilled in the art will recognize that a logical model must be adjusted according to software and hardware constraints, data volume, performance goals, and many other factors of the physical environment.

Both Star schemas and Snowflake schemas are utilized in accordance with an example embodiment of the present invention because varying degrees of system performance are necessary due to, for example, varying storage requirements. For example, a series of data that are particularly large will be stored as a snowflake schema. The snowflake design reduces the storage requirements of the large data, whereas a smaller series of data does not impact the overall size of the data warehouse, and, therefore, can be stored as a star schema. Star schemas typically require more hardware because of data explosion and indexing overhead. When the originating data is sufficiently small this is not a problem. Star schemas are typically easy to maintain, however, snowflake schemas typically require less hardware because less data explosion and less indexing overhead occur. Thus when data loads become sufficiently large, snowflake schemas may become a necessity. Moreover, performance techniques available in Star schemas, such as bit-map indexing and star-joins, are more difficult to implement and use than Snowflake schemas. Accordingly, one skilled in the art will recognize that the decision to implement a Star schema or a Snowflake schema is made in view of a plurality of variables.

In one dimensional model, a star schema is devoted to the housing of statistical output. This allows the end user to view the results of statistical models, while at the same time probe deeply into the archive of data stored in a data warehouse. This provides a combination of sophisticated statistical analysis and ad hoc query capabilities.

Another example modeling technique that can be used in the present invention is variable depth hierarchies. This technique involves the creation of a "bridge" table that intercedes between the Dimension and Fact table. The existence of the bridge table allows analysis to occur at any desired level and depth for an extremely flexible customer hierarchy. However, this technique increases the complexity of report design and can negatively impact usability. Accordingly, variable depth hierarchy structures are not highly desirable, but do provide some benefit with respect to data presentation.

Another example modeling technique that can be used in the present invention is Slowly Changing Dimensions (SCD). This technique involves keeping a history of important changes to Dimension table records. For example, it may be of great interest to record changes in the hierarchical structure of a company's sales force. Such historical records would allow business analysts to perform "as-was" analysis, rather than restricting them to "as-is" analysis, and perhaps yield important insight into desired measures.

In yet another example modeling technique, standardized hierarchies, users of the present invention interact with the system in a predictable fashion. Standardized hierarchies also allow similar, but not necessarily identical data, from multiple clients to be aggregated and displayed in the same data warehouse structure. This also facilitates the benchmarking of metrics across various clients.

In step S108 (FIG. 7), administrative requirements, reporting requirements and usability requirements are quantified and provided in the dimensional data model. For example, administrative constraints include time required for data backup and disaster recovery, time for extraction, transformation and loading runs ("ETL"). The ETL processes developed enable data from OLTP and other data sources to be collected through a standardized process. The transformation of the data occurs when a plurality of business rules are applied in a specific sequence—aggregations, calculations, averages, percentages, linkages, etc.—which allow transactional data to be viewed analytically. The intellectual capital applied to the transformation process is critical as the business rules provide the foundation for viewing the data in an analytical fashion. The loading process populates the customized data warehouse with the transformed data.

Further, costs associated with help desk support, mission criticality of data warehouse, and systems operations/support for training personnel are provided. Administrative constraints are necessary inputs to the model in order to provide accurate predictive outcome measures. In accordance with an example embodiment of the present invention, the dimensional data modeling provides weights for reporting specifications, usability requirements and administrative constraints.

In addition to administrative requirements, reporting and usability requirements are preferably defined and provided in the dimensional data model (step S108).

After dimensional entities and performance measures are defined (step S106), then, in step S110 the relationships there-between are preferably provided. The relationships represent the impact of data sources, integration points and cross-data source, fact table and subject area joins. Thereafter, in step S112, the physical dimensional model is provided.

After steps S100–S112 are complete, the model is validated (step S114) and refined (step S116). For example, during an aggregating step in the model design, data compression is evaluated where compression of 1:5 or better is desired.

FIG. 8 illustrates dimensional entities that are aggregated in the dimensional modeling process in order to provide predictive outcomes. For example, dimension tables are defined for a sales account, assets, transactional information (e.g., call detail, fulfillment), inventory, invoices/orders, offers and promotions, sales contact and products.

The dimensional entities illustrated in FIG. 8 represent sources of information to be aggregated during the dimensional data model process. Moreover, performance measures with respect to each of the dimensional entities shown in FIG. 8 are defined and integrated into the data model. Examples of performance measures include but are not limited to aggregate measures (including snapshot sums and rolling sums), calculated and derived values (including compound calculations, cycle times, scores and segment bands including contribution percents, rankings, differences, multiplicative products and sums), qualities (including non-additive numeric or text fields identifying a flag or status condition such as price, current, etc.), quantities (such as counts, dollars and units) and time-based information (including current, period-to-date, rolling, this period versus prior period and the like). By incorporating performance measures into the model, the performance of a sales force can be extrapolated and presented in meaningful ways. Performance measures are derived and provided by clients and incorporated as a data source into the data warehouse model.

An example embodiment of the present invention uses the data in the data warehouse for statistical data analysis, for example, by using linear regression algorithms. As noted above, dimensional modeling is provided so that statistical analysis can be performed on data stored in the data warehouse. Preferably, data are extracted from the data warehouse and provided to a statistical engine where statistical analysis routines are performed on the data. The data are preferably modified thereby, and uploaded back into the data warehouse for presentation purposes.

Data provided in dimensional models are preferably analyzed in accordance with statistical algorithms available in SAS. SAS is preferably used for statistical analysis because of the many flexible and versatile ways data can be analyzed. As noted above, statistical analyses are performed on the data to provide predictive and explanatory power in reference to dependent variables. Further, SIEBEL ANALYTICS is preferably used for a presentation package that provides graphic representations of the data model.

Figure 8A:
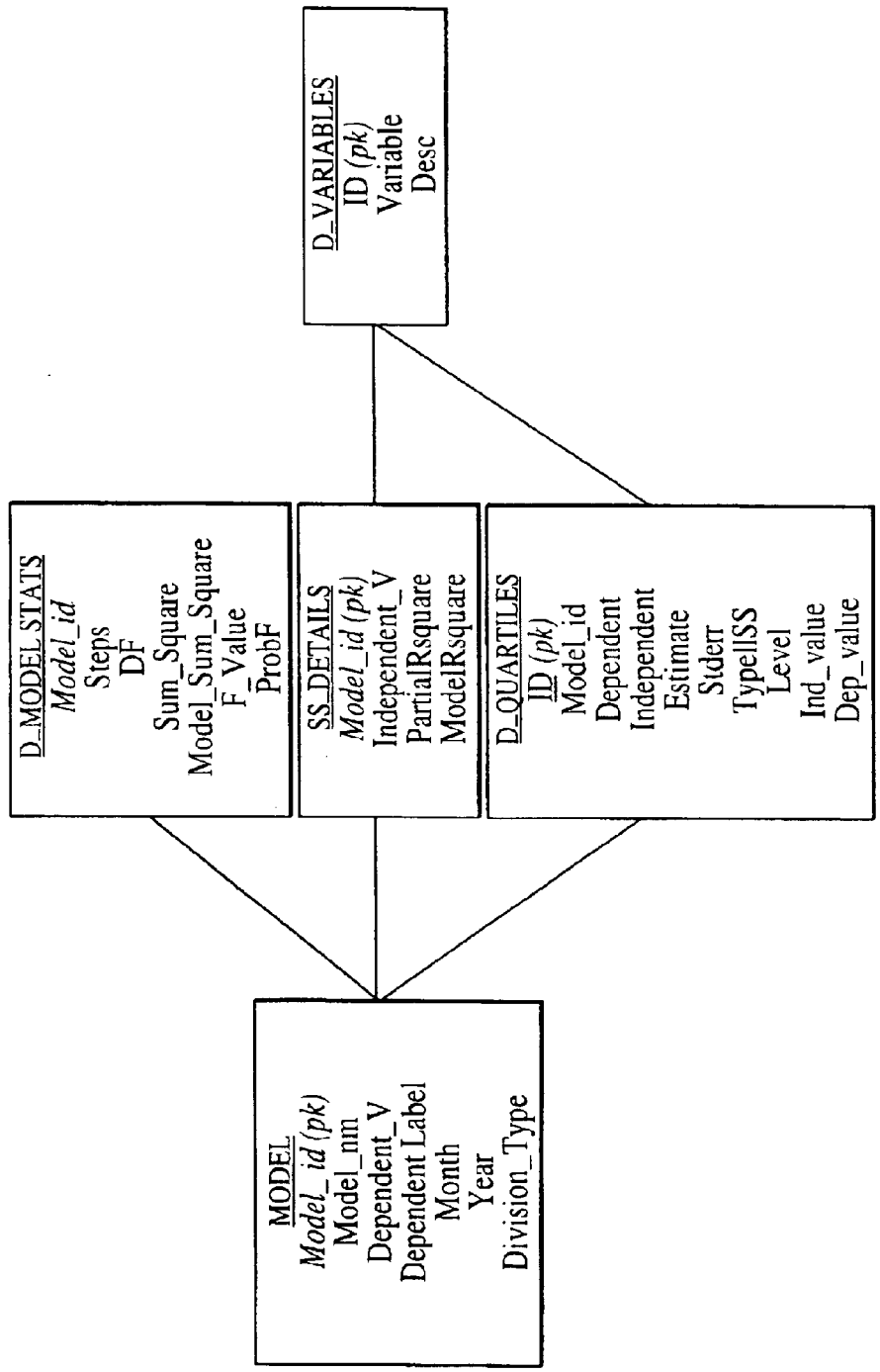
FIG. 8A illustrates an exemplary physical dimensional model for receiving output from statistical analyses in accordance with an example embodiment of the present invention.

The statistical analysis procedures of the present invention preferably return outputs from a defined set of inputs, such as those shown in FIG. 5A. The outputs are statistical analyses that provide insights, via visual representations, about the performance of a sales force operating in a CRM/SFA environment. Such modeling enables users to determine which business practices are effective and which are not. Further, improved future planning is possible by studying the representations provided by the data modeling. The statistical output is then brought into the dimensional model. An example physical dimensional model for receiving output provided by statistical analyses of the present invention is shown in FIG. 8A.

In other words, the statistical model is formed from a series of outputs from several statistical procedures, preferably coded in SAS, that estimate the impact of data elements such as CRM/SFA Usage, Help Desk Support, Training Records, and Sales Representative experience (i.e., independent variables) on items of interest such as but not limited to Sales Representative Quota Performance, CRM/SFA adoption, and Sales Representative call volumes to key physicians (i.e., dependent variables). This statistical procedure is a multiple linear regression which implements a stepwise variable selection method. The goal of this procedure is to generate a series of numeric parameters that explain the relationships each independent variable has with the dependent variables. The results of the multiple linear regression can be displayed as a mathematical formula: $Y=\beta_1 X_1+\beta_2 X_2$. In this equation, Y represents the dependent variable while $X_1$ and $X_2$ represent independent variables. $\beta_1$ and $\beta_2$ represent the effects that each independent variable has on the dependent. Thus, if $\beta_1=0.5$ then a one unit increase in $X_1$ results in a 0.5 unit increase in Y. Typically, an enterprise can exercise control over dependent variables by understanding the relationship several independent variables have with them. This implies understanding how dependent variables like Sales Representative Quota Performance are affected by Sales Representative behavior with respect to certain business practices.

As noted above, in addition to SAS, the present invention preferably employs analytic software, such as provided in SIEBEL ANALYTICS, to assist with the dimensional modeling of the statistical output as well as provide a graphical user interface that is more accessible to a non-technical end-user than industry standard statistical modeling output. The statistical models estimate the degree of impact that elements an enterprise can exercise control over (i.e., independent variables) have on those variables that the enterprise wants to impact, but cannot, typically, control. The models preferably quantify the degree to which independent variables impact each dependent variable and stores the analysis in the data warehouse environment. To this end, the statistical output from the SAS environment is brought into the dimensional model and stored as additional data warehouse tables.

Thus, an example embodiment of the present invention collects, transforms, analyzes, and prepares data for reporting. Data are preferably mapped to actual business processes. Since every display screen in CRM/SFA applications reflects some business process, conclusions can be drawn based upon the display screen that is accessed by a sales representative.

With respect to data presentation, as noted above, an example embodiment of the present invention uses intuitive presentation tools that provide insights into the operational, usage and statistical data described above. Referred herein, generally, as "dashboards," access to a series of interactive and hyperlink-based reports are provided in a logical way. Preferably, interactive reports are organized by the dashboards in accordance with predefined groupings or tabs in a graphic user interface. Each tab is organized into sections, and hyperlinks are provided in each section that represent and provide access to reports that present more or less detailed views of information. For example, after a tab is selected, sections of reports are presented in standard web browser software. Further, filtering and other data related mechanisms are provided that allow a user to toggle between, for example, sales representative screen views (referred to as "hits"), and duration of screen view usage. Also for example, reports are preferably provided that represent CRM/SFA usage by a sales force, a division, and an individual sales representative.

Figure 9A:
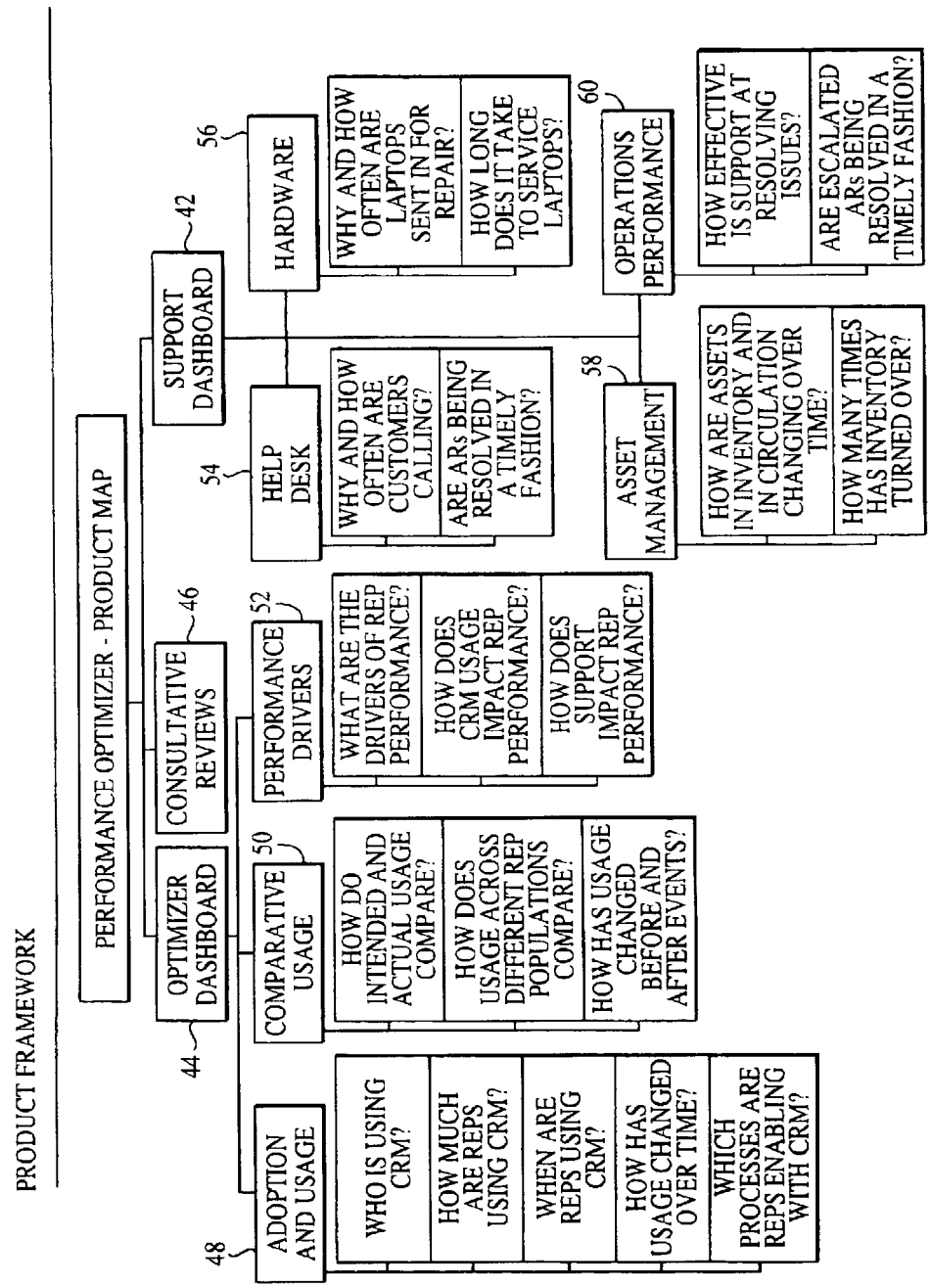
FIG. 9A is a block diagram that illustrates two data presentation dashboards used by an example embodiment of the present invention.

FIG. 9A is a block diagram that illustrates two dashboards as defined and used in an example embodiment of the present invention. As shown in FIG. 9A, a "support" dashboard 42 and an "optimizer" dashboard 44 are illustrated near the top of the diagram.

As shown in FIG. 9A, the optimizer dashboard 44 comprises tabs representing CRM/SFA technology adoption and usage 48, sales representative comparative usage 50, and sales representative performance drivers 52. The support dashboard 42 comprises tabs representing help desk information 54, hardware information 56, asset management information 58 and operations performance 60. The questions that are illustrated in FIG. 9A relate to respective tabs, and represent sections of one or more interactive reports.

The reports provided by the dashboards represent the intersection of data sources (e.g., sales representative performance and CRM/SFA usage) and are enabled, in part, from the dimensional data modeling techniques employed, as described above.

Furthermore and as shown in FIG. 9A, consultative reviews 46 are preferably provided by the present invention to evaluate data captured by end users and the representation of that data in the respective dashboards. Data are mined from users of the present invention, and by providing a shared learning process, results of the data can be meaningfully interpreted, for example, to develop action plans, measure success and provide performance reviews. Of course, one skilled in the art will recognize that many various business strategies can be implemented by useful interpretation of the data represented by the dashboards.

The customization and extension to tables used by, for example, SIEBEL ANALYTICS, represent a significant change (over 50%) from the original design. This insulates the development effort from having to cope with future changes to this design by SIEBEL. In addition, the present invention affords a usage data model, for example, as represented in FIGS. 6A–6I, and a predictive data model, as represented in FIG. 8A. Moreover, in accordance with an example embodiment of the present invention, an inventory management data model, a knowledge management data model, and a computer telephony integration data model are preferably provided as well.

Further, the present invention preferably leverage SIEBEL ANALYTICS' ability to perform cross fact table joins before manifesting such joins as a physical database table. For example, the buffer size setting on the analytical server must be set to ensure that it can accommodate large joins across fact tables. Further, a determination is preferably made whether SIEBEL ANALYTICS has the ability to prevent Cartesian product joins, and, if so to prevent such joins (assuming that users would not need such a Cartesian).

If such a Cartesian join is required, then consider creating a such a cross-dimension table (also known as a factless-fact table).

Once the plurality of data sources are aggregated through the combination of data extraction, data modeling, data warehousing and statistical analysis, presentation of said data is accomplished through the configuration and creation of reports and tables. The reports and tables are configured and displayed such that a user of the invention can visualize a comprehensive view of key measures within their CRM/SFA environment, especially the relationship between the data sources integrated, e.g., CRM/SFA usage data, LMS data, demographic data, performance data, support data, business unit data, etc. The data are structured in a repository to allow calculations for data de-normalization, data aggregation and the final presentation.

Figure 9B:
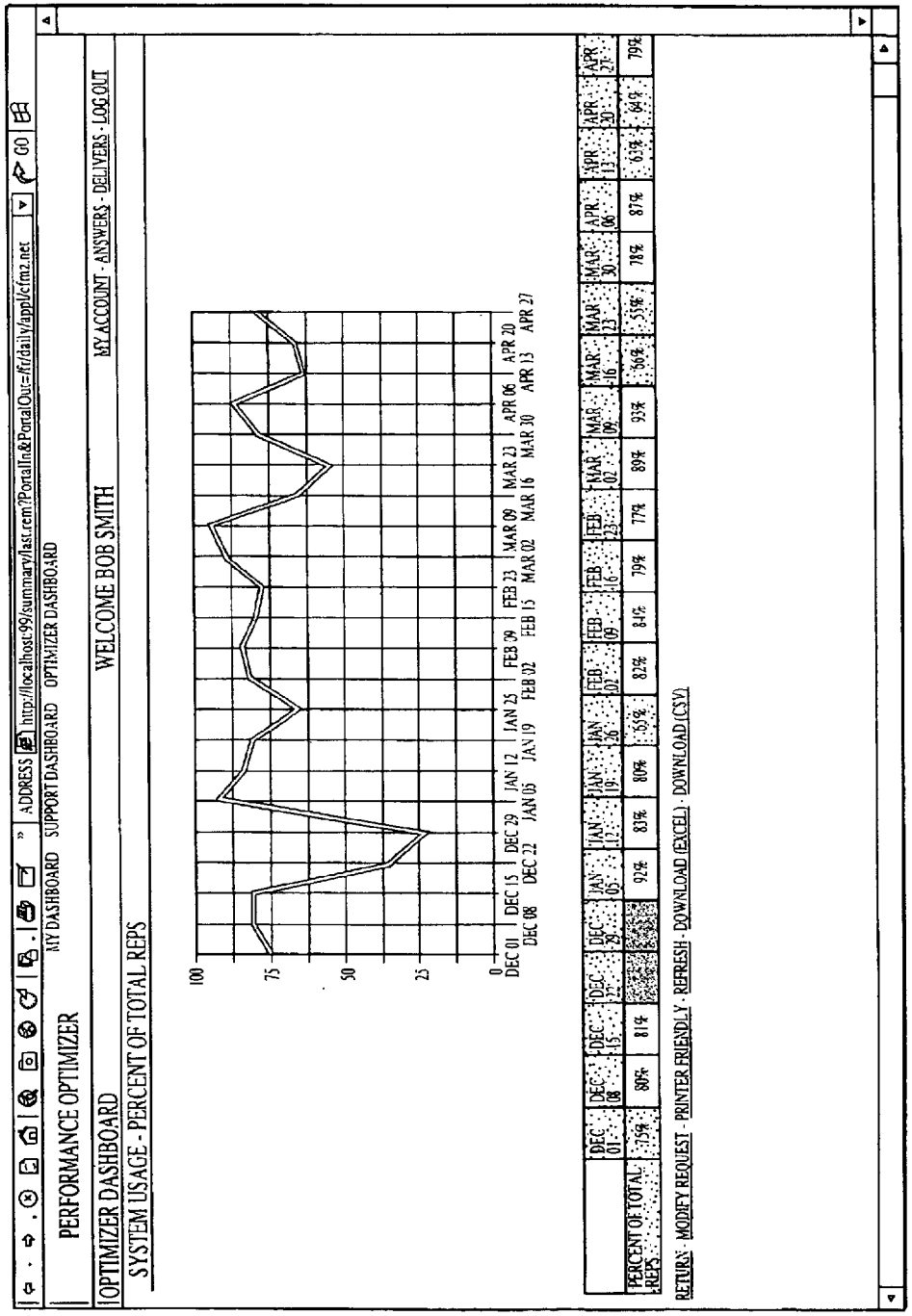
FIGS. 9B–9Q illustrate example presentation of data models.
Figure 9C:
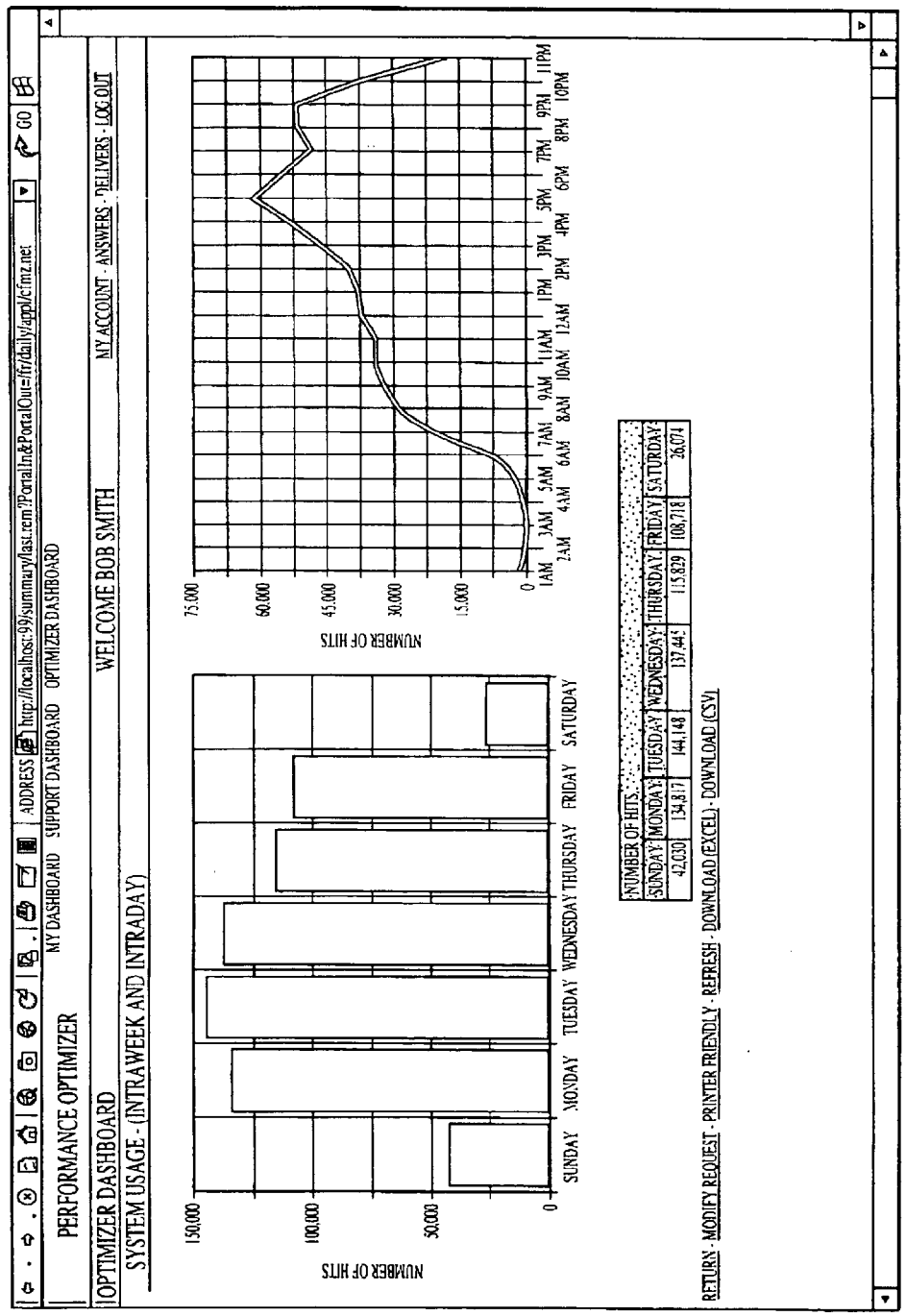
Figure 9D:
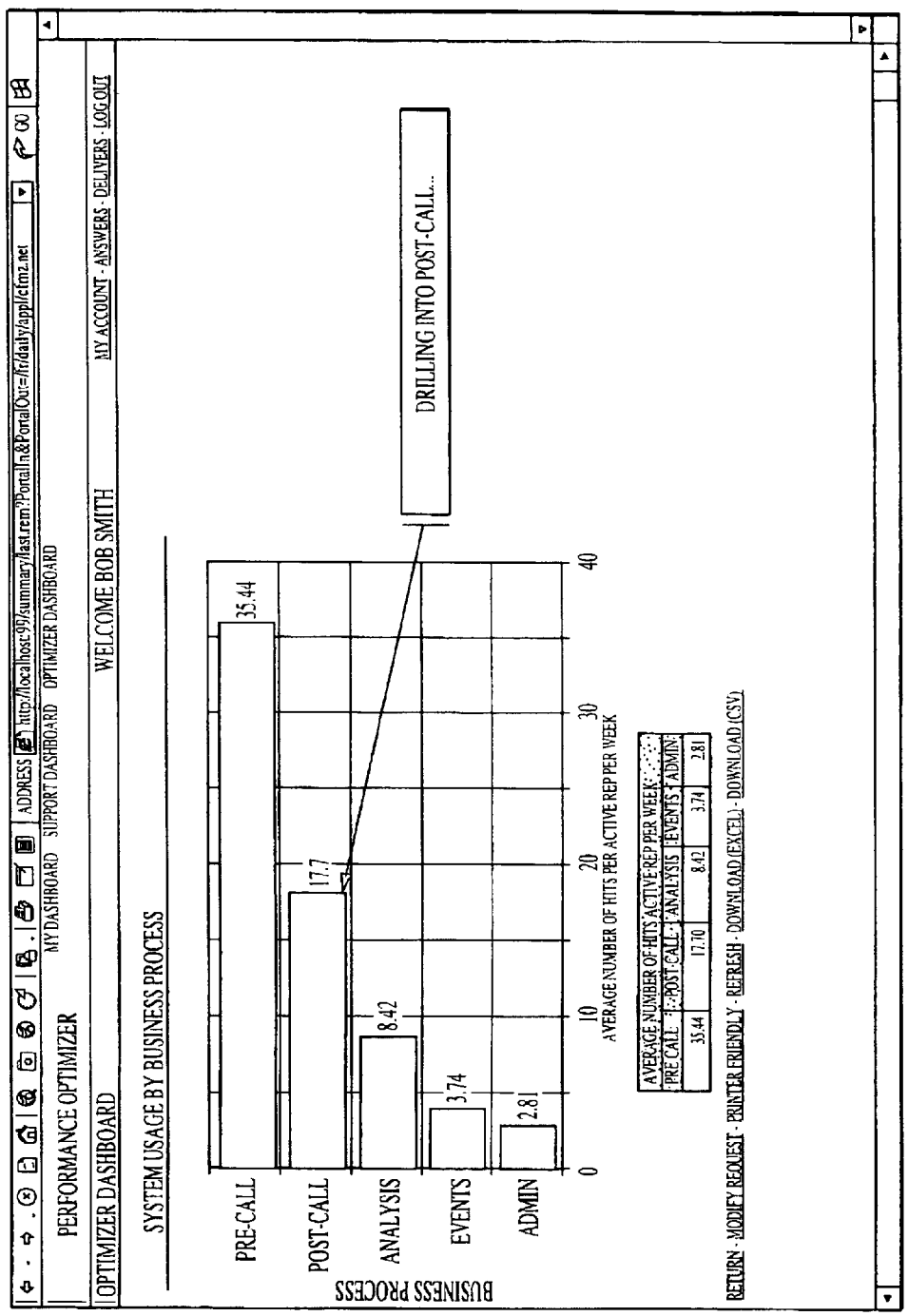
Figure 9E:
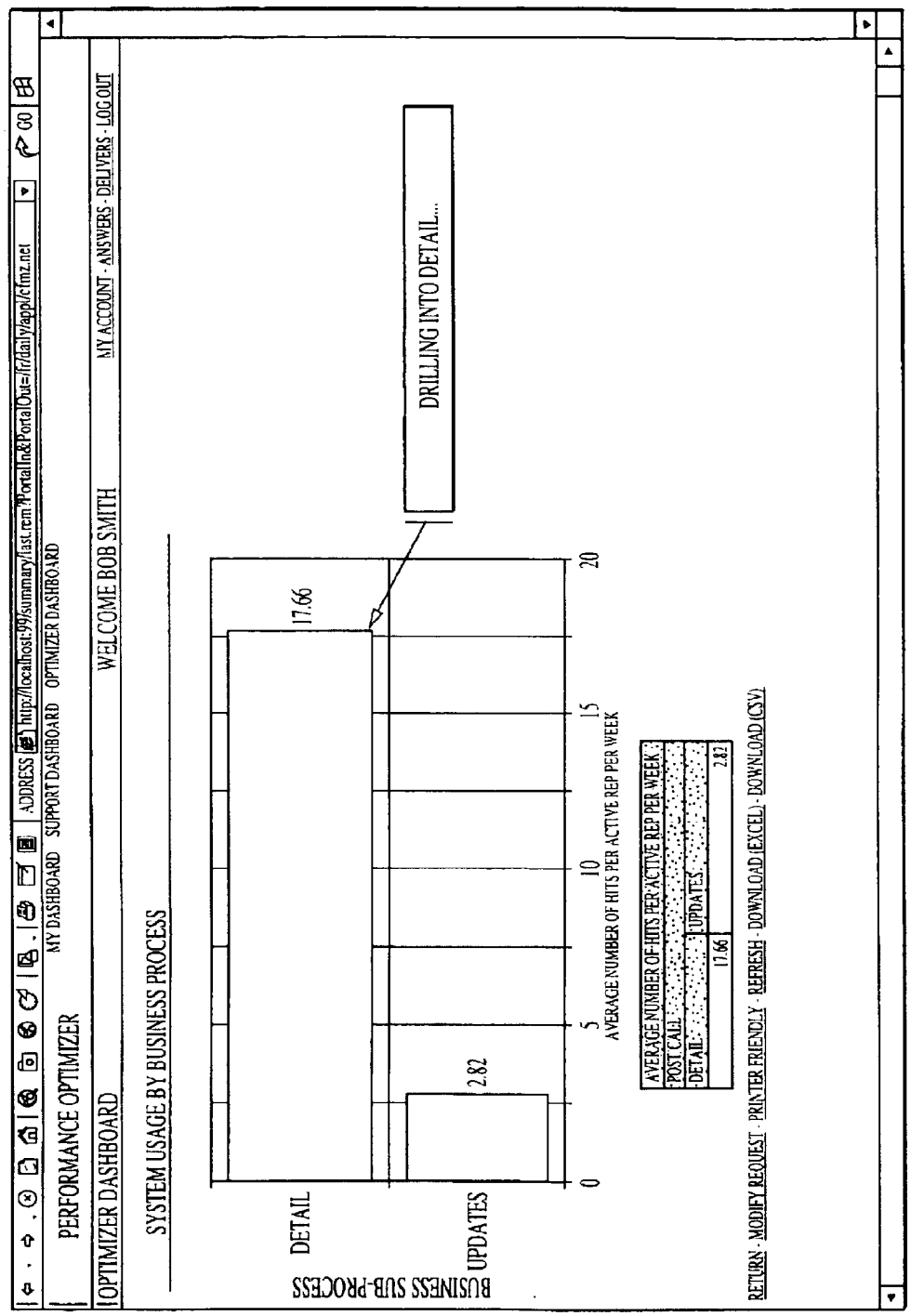
Figure 9F:
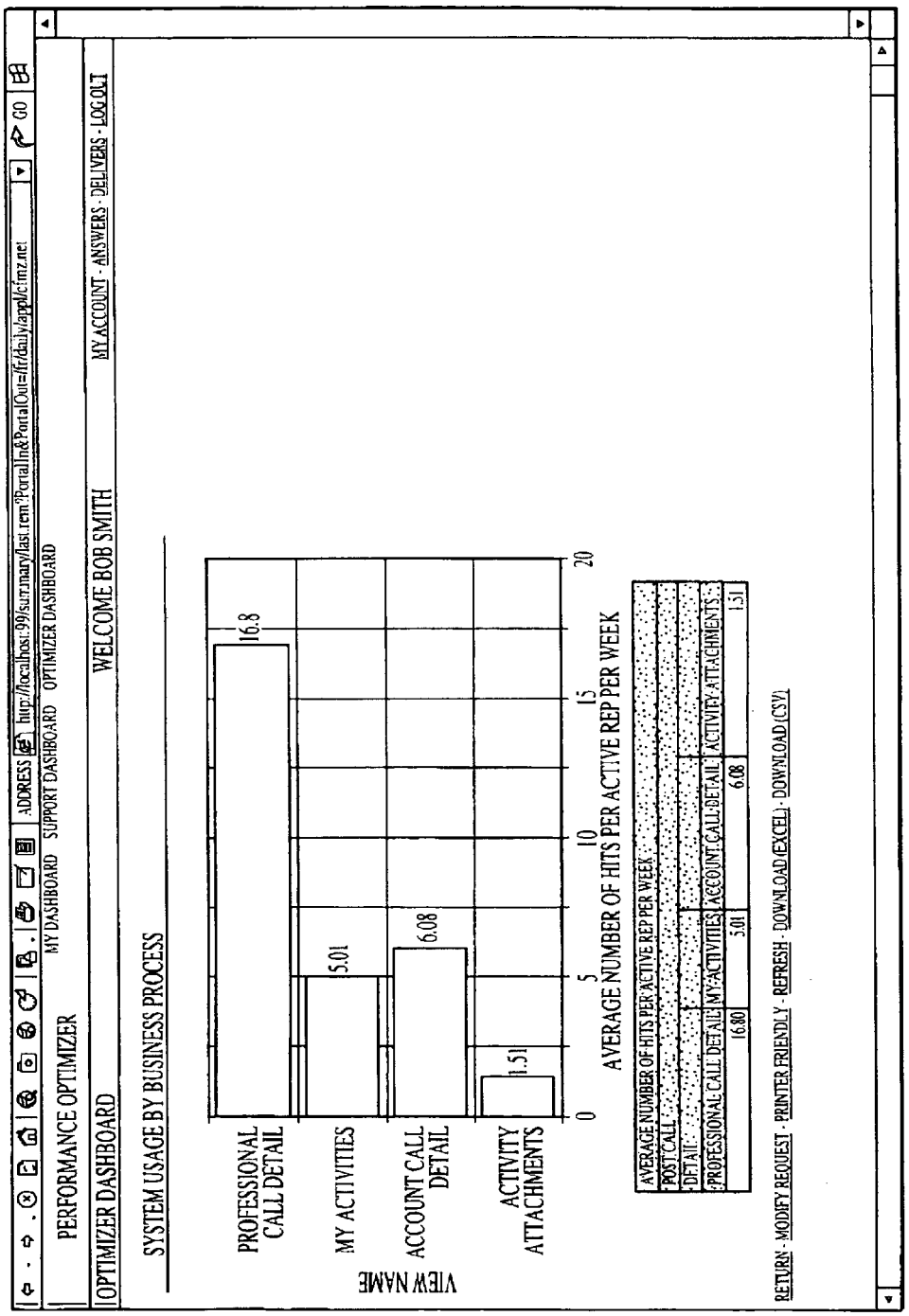
Figure 9G:
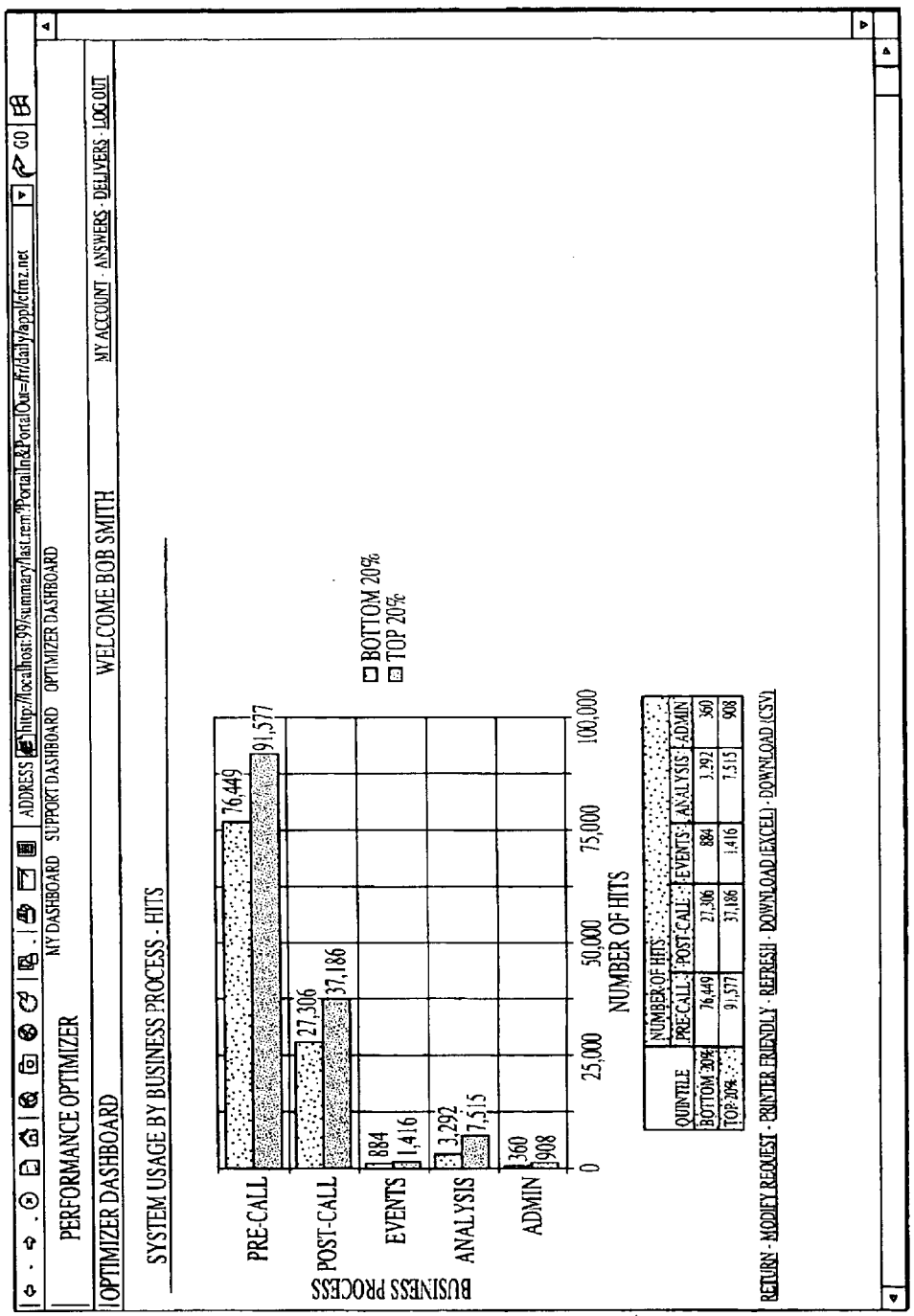
Figure 9H:
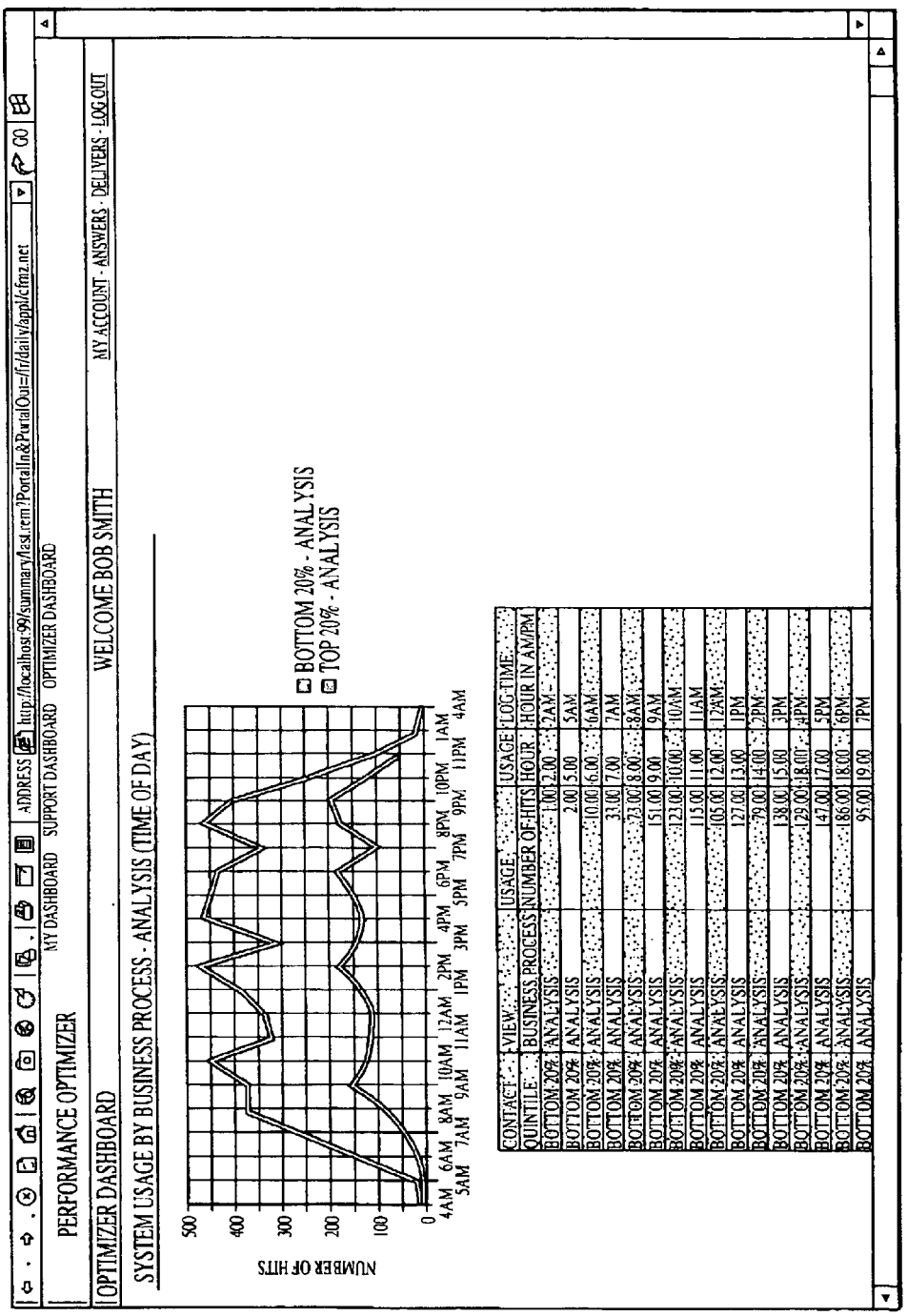
Figure 9I:
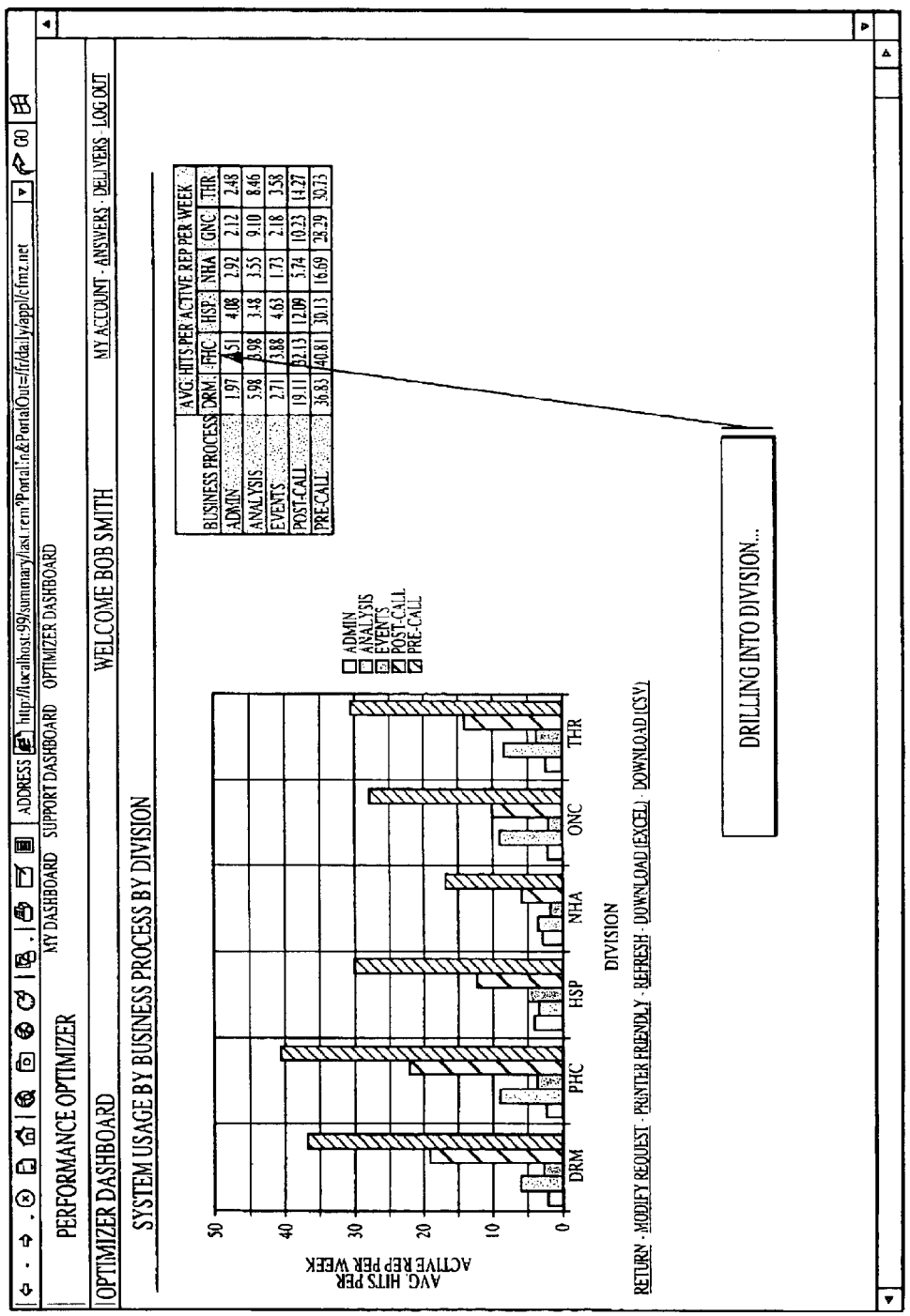
Figure 9J:
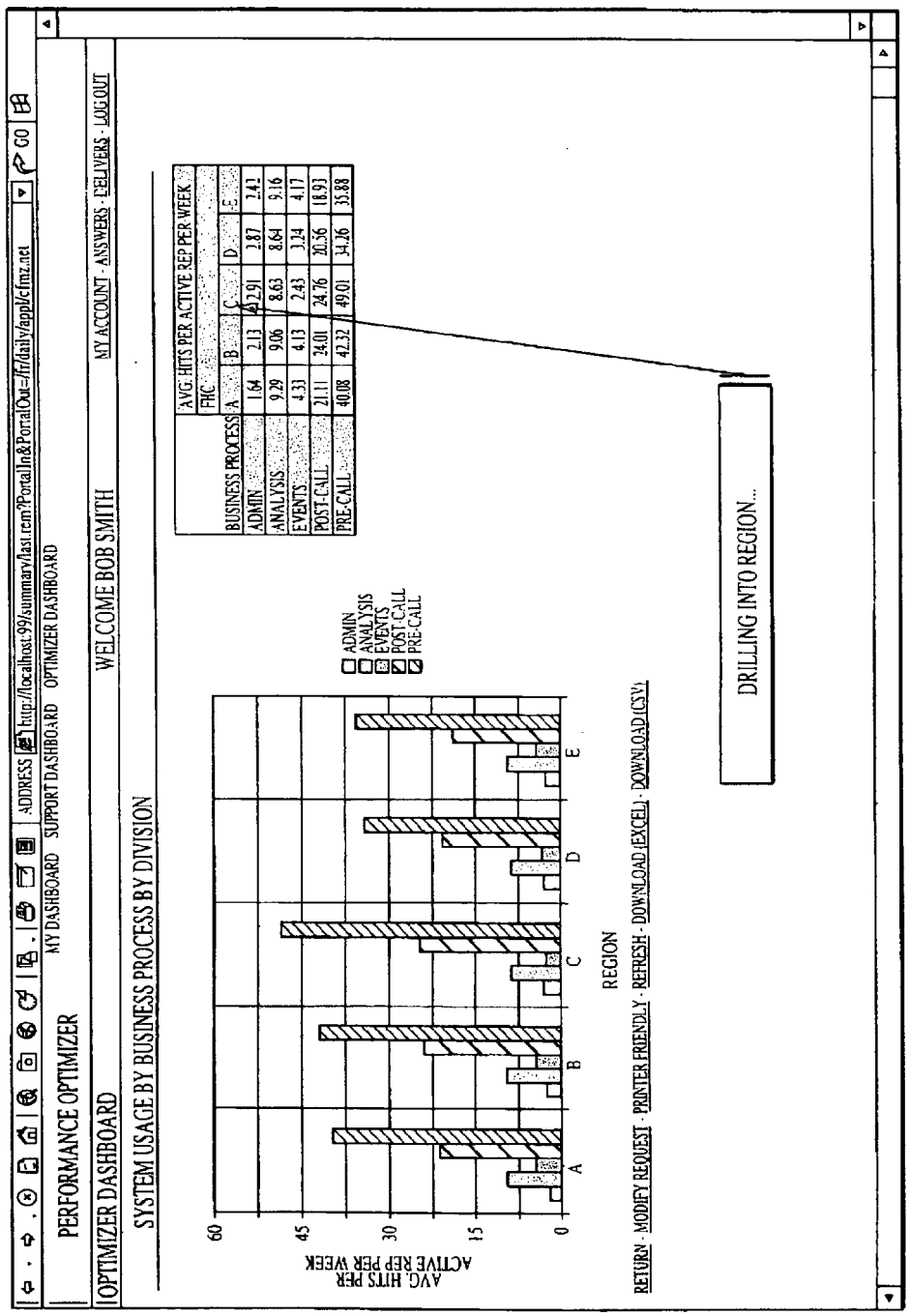
Figure 9K:
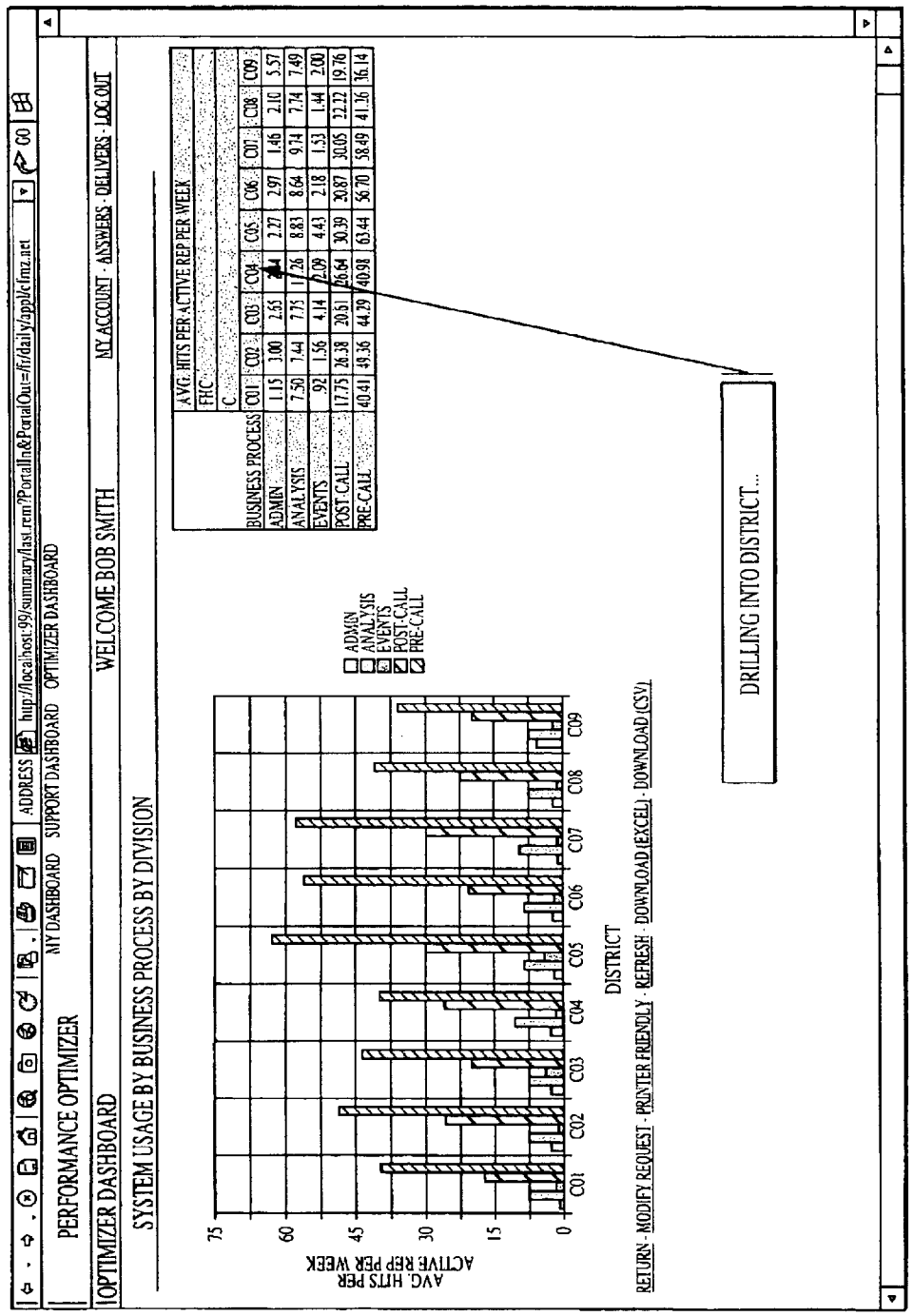
Figure 9L:
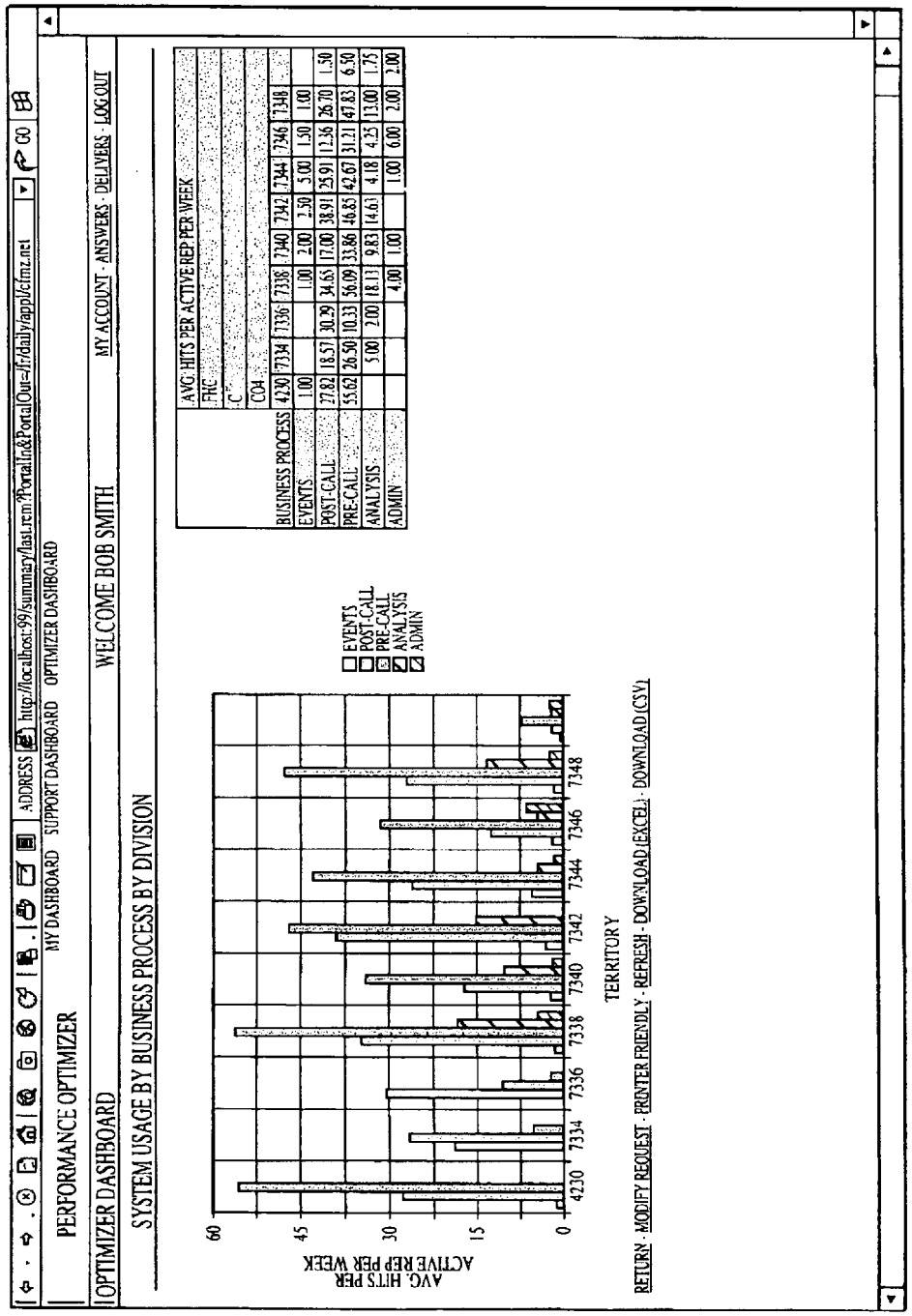
Figure 9M:
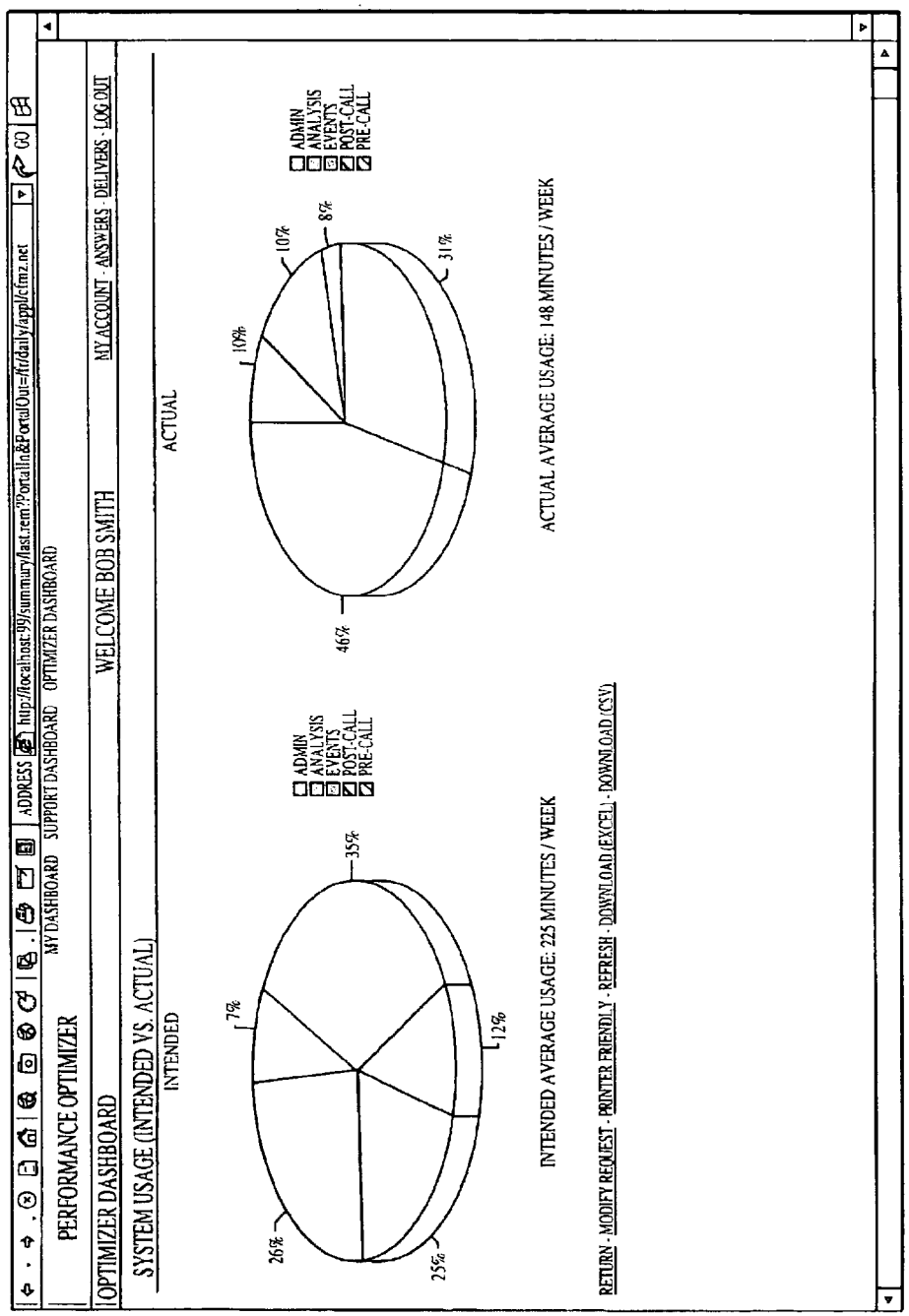
Figure 9N:
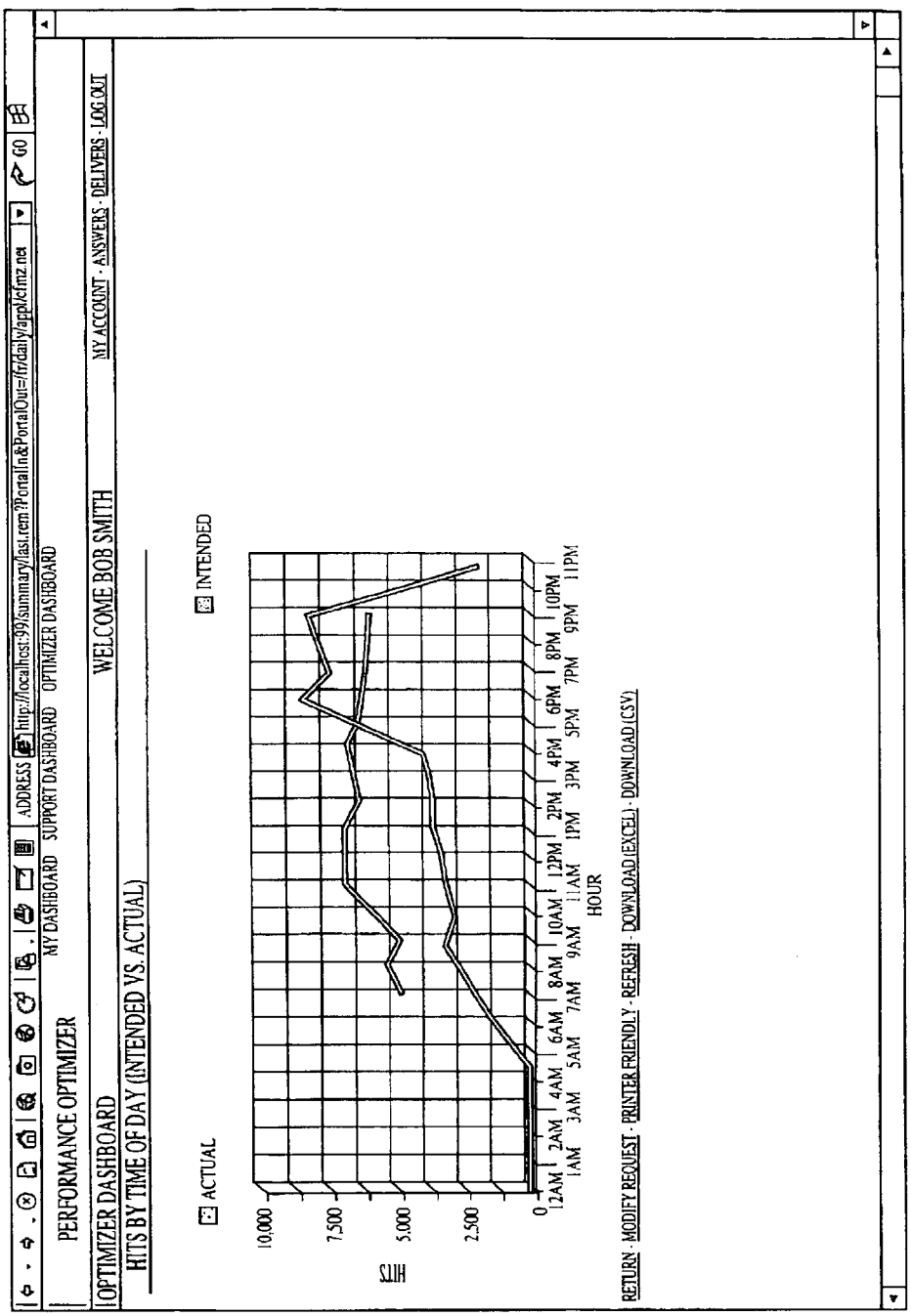
Figure 90:
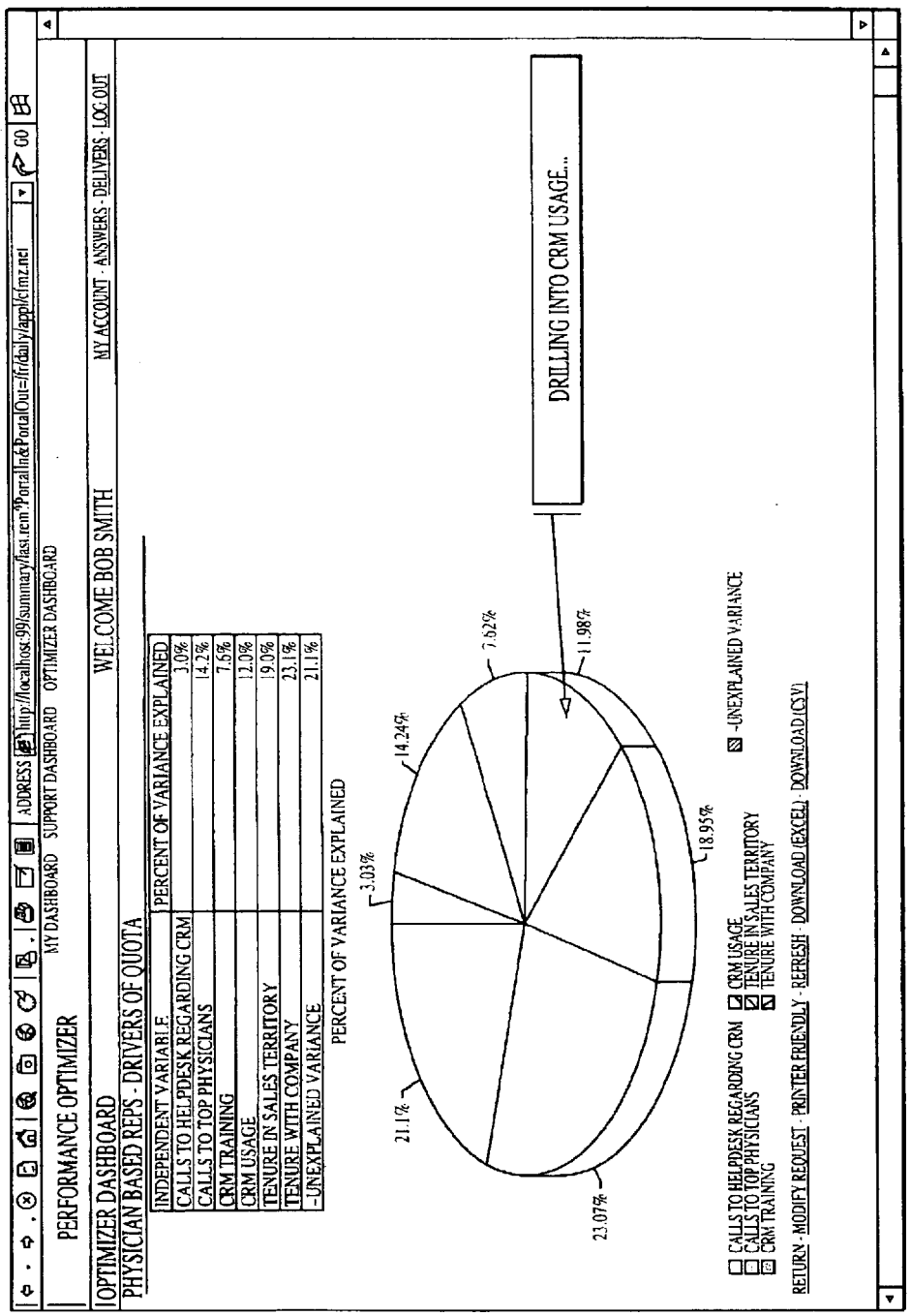
Figure 9P:
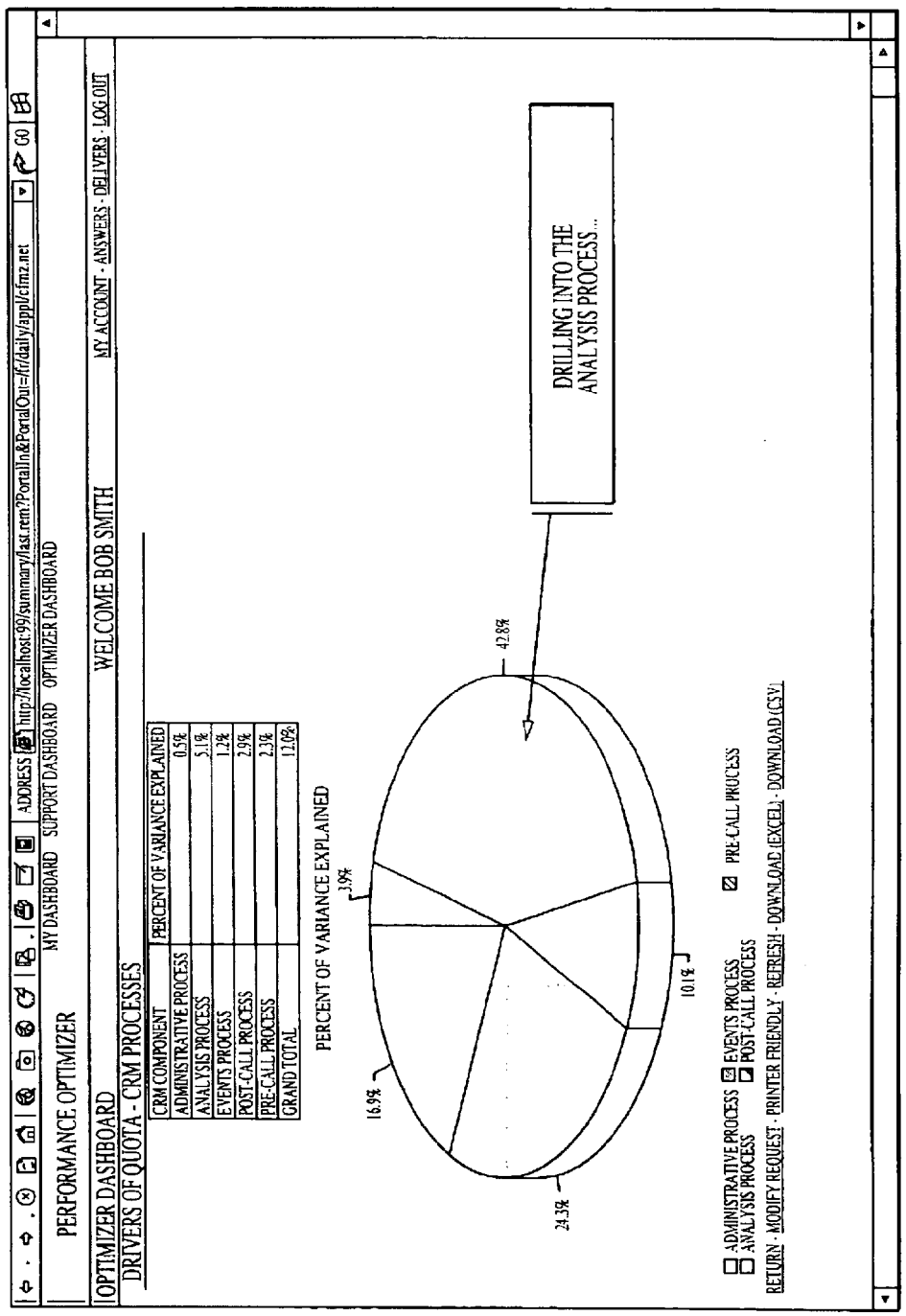
Figure 9Q:
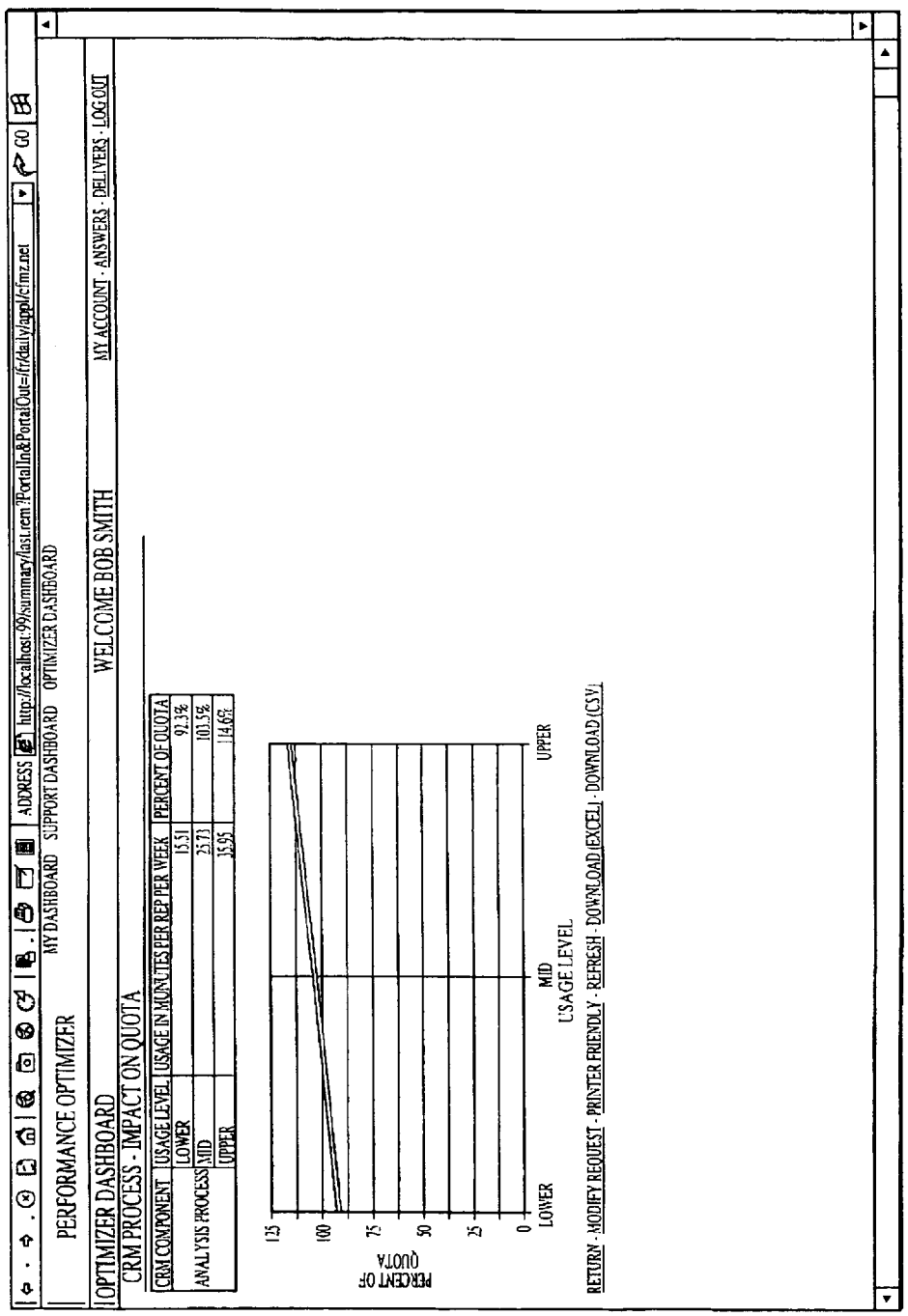

FIGS. 9B–9Q show example presentations of data models in accordance with an example embodiment of the present invention. The dashboards and corresponding views provide valuable insights for management and upper management with respect to the effectiveness of CRM/SFA systems and related data sources. By providing visual tools, including drill-down enabled graphics that illustrate the relative impact of dependent variables on a sales representative's performance, business decisions and practices can be developed and implemented to improve sales force productivity.

FIG. 9B is an example report that provides an answer to how many sales representatives are using a CRM/SFA system regularly. The line graph shown in FIG. 9B illustrates a graph that tracks a percentages of sales representatives that are using CRM on a weekly basis. The report shown in FIG. 9B illustrates when usage falls below predefined thresholds. Further, the example report in FIG. 9B assists the viewer to understand how much field force interventions and events are impacting CRM/SFA adoption and usage.

FIG. 9C is an example report that provides an answer to when sales representatives are using a CRM/SFA system. As shown in FIG. 9C, the viewer is able to understand CRM usage patterns intra-week and intra-day, and further to determine peak usage and required support staffing levels.

FIG. 9D is an example report that provides an answer to what business processes are being enabled by CRM/SFA systems. As shown in FIG. 9D, the viewer is able to track average frequency and duration of CRM/SFA usage for each business process. Further, the information provided in FIG. 9D enables the viewer to leverage findings to refine and focus end-user coaching and training. The viewer is afforded the ability to apply the teachings of FIG. 9D in order to identify and prioritize future technology enhancements and upgrades. FIG. 9E is an example report that illustrates the ability of the viewer to "drill" into more detail with respect to the report shown in FIG. 9D. As shown in FIG. 9E, CRM/SFA usage with respect to "post-call" activity is represented. FIG. 9F is an example report that illustrates CRM/SFA system usage by business process and includes percentages of sales representatives that use CRM/SFA systems for professional call detail, individual activities, account call detail and activity attachments.

FIGS. 9G and 9H are example reports that provide an answer to whether top performing sales representatives (i.e., those that successfully meet performance goals) use CRM/SFA differently compared to their peers. The report shown in FIG. 9G enables the viewer to understand how much top and bottom performers are using CRM/SFA systems to manage discrete sub-processes within each business process. Further, the report compares frequency and duration of CRM/SFA system usage for each sub-process. The viewer preferably uses differences to coach bottom performers on how to use different CRM/SFA system components can improve individual performance.

The example report shown in FIG. 9H illustrates a comparison system usage between top and bottom sales representative performers during a given day (i.e., intra-day (hourly) usage analysis). The report enables the viewer to understand when top and bottom performers are using different CRM components, and compares the frequency and duration of usage for each CRM component. The viewer can leverage differences to coach bottom performers on when to more effectively use different CRM components.

FIGS. 9I–9L are an example reports that provide an answer to how CRM usage compares across business units and geographies. The reports provide a comparison of how much sales representatives across different divisions (FIG. 9I), regions (FIG. 9J), districts (FIG. 9K) and territories (FIG. 9L) are using CRM to manage key business processes. The reports shown in FIGS. 9I–9L illustrate the ability of the viewer to access varying degrees of detail using the hyperlink-based reports of the present invention. The reports shown in FIGS. 9I–9L track how CRM/SFA system adoption and usage trend over time for each division, benchmark CRM/SFA system adoption and usage against industry averages and best practices.

FIGS. 9M and 9N are example reports that provide an answer to how does actual usage compare with intended usage. The reports measure how much actual usage (measured) deviates from intended usage (established by CRM/SFA system process experts). The reports also illustrate overall level of usage and usage pattern during the day. Further, the information provided therein enable the viewer to coach sales representatives on how to more effectively integrate CRM/SFA usage with daily call activities. Further, the reports track changes in sales representative behavior over time, and drive improvements in the quality of call recording.

FIG. 9O is an example report that provides an answer to whether using CRM technology impacts field rep performance. The report identifies the key drivers of sales representative field performance, with respect to effectiveness and productivity. Further, the report enables the view to determine the relative contribution of a CRM/SFA environment to sales representative field performance, including, for example, CRM/SFA usage, training and support.

FIG. 9P is an example report that provides an answer to what business processes, enabled by a CRM/SFA system, drive rep performance. The report enables the viewer to determine the relative contribution of different CRM/SFA-enabled business processes to sales representative field performance. The viewer can leverage findings to refine and focus end-user coaching and training, and to apply learnings to identify and prioritize future technology enhancements and upgrades.

FIG. 9Q is an example report that provides an answer to how much do specific CRM/SFA business processes drive sales representative performance. For each business process, the report measures how different levels of CRM/SFA usage predict sales representative field performance. The viewer is able to leverage findings to modify sales representative behavior in order to increase adoption and usage of CRM/SFA components that drive performance. Further, the report enables the viewer to streamline a CRM/SFA system by deactivating components that represent a drag on performance.

Thus, the data presentation features of the present invention, as illustrated in FIGS. 9B–9Q, provide valuable insights by graphically displaying information in hyperlink-based reports, for example. The configuration, design and application of functionality provided by the reporting package employed, preferably, SIEBEL ANALYTICS or similar, is structured such that users view high-level information and are able to "drill down" to the lowest level of granularity. The techniques manifested in the presentation and packaging of the data provide valuable insights to the combinations of data, and structure the data in cross-sectional and longitudinal views. This representation of the output data from the statistical modeling allows users to visualize the drivers of sales representative performance and the relative impact of each of those drivers. The entire presentation layer is built upon the data warehousing structure, for example, reports and tables are built and organized in logical groupings for easy end-user navigation.

Although exemplary embodiments of the present invention are described with reference to CRM/SFA environments, the invention is not so limited. One skilled in the art will recognize that the implementation of usage capture technology, or at least portions thereof, can be configured to operate in many software environments beyond CRM/SFA systems. Further, information received from usage capture system 38 can be aggregated and segmented with transactional data from many systems besides a CRM/SFA system. Moreover, the dimensional modeling and statistical analysis described herein are applicable to many software and hardware environments besides CRM/SFA. Examples of software and hardware embodiments that can benefit from the teachings provided herein include, but are not limited to, patient care systems, legal practice management systems, emergency response management systems, insurance management systems, etc. Countless hardware and software systems can be improved by implementing the systems and methods described herein.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A method for providing at least statistical information, the method comprising:

obtaining usage information by performing surveillance on a person's interaction with technology, the usage information representing at least one selected from the group consisting of a display screen viewed by the person, a length of time a data entry display screen is viewed by the person, an on-line transmission with the person, an identifier of a data report accessed by the person, an identifier of a query executed by the person, and an identifier of a component in a data entry display screen accessed by the person;

obtaining transactional information, the transactional information representing information collected by the technology;

at least one of aggregating and segmenting at least one of the usage information and the transactional information to provide at least one of aggregated information and segmented information;

performing data modeling on at least one of the aggregated information and the segmented information;

applying at least one statistical methodology on at least one of the modeled aggregated information and the modeled segmented information to provide statistical analysis information; performing data modeling on the statistical analysis information; and presenting the modeled statistical analysis information.

2. The method of claim 1, wherein the technology includes a CRM/SFA system and the transactional information being related to at least one of sales contacts and sales calls.

3. The method of claim 2, wherein the usage information further identifies a portion of the CRM/SFA system used by the person.

4. The method of claim 3, wherein the usage information further represents an amount of time the person used the portion of the CRM/SFA system.

5. The method of claim 1, wherein the step of performing data modeling includes dimensional modeling.

6. The method of claim 5, wherein the dimensional modeling includes at least one of a star schema and a snowflake schema.

7. The method of claim 5, wherein the dimensional modeling includes variable depth hierarchies.

8. The method of claim 5, wherein the dimensional modeling includes slowly changing dimensions.

9. The method of claim 5, wherein the dimensional modeling includes standardized hierarchies.

10. The method of claim 1, further comprising;
receiving at least one of help-desk support information, professional performance information being related to the person's professional performance, technical support information, administrative information, planning information, training information, pre-sales call information, and post sales call information; and
performing at least one of aggregating and segmenting the at least one at least one of help-desk support information, professional performance information, technical support information, administrative information, planning information, pre-sales call information, post sales call information to contribute to the at least one of aggregated and segmented information.

11. The method of claim 10, wherein the professional performance includes the person's ability to meet a sales quota.

12. The method of claim 1, wherein the technology includes at least one of an information processor, a user terminal and a communication network.

13. The method of claim 1, wherein the step of modeling includes predictive modeling.

14. The method of claim 1, wherein the step of applying the at least one statistical methodology includes applying multiple linear regression that implements a stepwise variable selection method.

15. The method of claim 1, wherein the step of presenting the modeled statistical analysis information includes providing at least one report that is displayable in web browser software.

16. The method of claim 15, wherein the at least one report includes hyperlinks to at least one other report.

17. The method of claim 15, wherein the at least one report demonstrates at least one of how the technology is used, when the technology is used, the business processes that are enabled by the technology, the duration of time that the technology is used and how actual technology usage compares with intended technology usage.

18. The method of claim 1, wherein the usage information and the transactional information are related to at least two people.

19. The method of claim 18, wherein the step of presenting the modeled statistical analysis information includes providing at least one report that compares at least one of:
the at least two people's intended usage of the technology versus actual usage of the technology;
how the at least two people use the technology;
when the technology is used by the at least two people; and
the at least two people's duration of time that the technology is used.

20. The method of claim 1, further comprising storing information related to at least one of the usage information, transactional information, aggregated information, segmented information and statistical analysis information in a data warehouse.

21. A system for providing information, the system comprising:
a usage capture module structured for capturing usage information by performing surveillance on a person's interaction with technology, the usage information representing at least one selected from the group consisting of a display screen viewed by the person, a length of time a data entry display screen is viewed by the person, an on-line transmission with the person, an identifier of a data report accessed by the person, an identifier of a query executed by the person, and an identifier of a component in a data entry display screen accessed by the person;
a transactional information module that provides transactional information collected by the technology;
a professional performance information module that provides performance information representing the person's professional performance;
a data reorganization module that performs at least one of aggregating and segmenting at least one of the usage information, the transactional information and the performance information;
a data modeling module that performs data modeling on the at least one of aggregated and segmented information;
a statistical methodology module that applies at least one statistical methodology on the at least one of aggregated and segmented information provide statistical analysis information;
a statistical analysis data modeling module for performing modeling on the statistical analysis information;
a data warehouse for storing information related to at least one of the usage information, the transactional information, the performance information, the aggregated information, the segmented information and the statistical analysis information; and
a presentation module for at least one of presenting the modeled statistical analysis information and correlating the person's professional performance and the person's use of the technology.

22. The system of claim 21, wherein the technology includes a CRM/SFA system and the transactional information is related to at least one of sales contacts and sales calls.

23. The system of claim 22, wherein the usage information further identifies a portion of the CRM/SFA system used by the person.

24. The system of claim 23, wherein the usage information further represents an amount of time the person used the portion of the CRM/SFA system.

25. The system of claim 21, wherein the data modeling includes dimensional modeling.

26. The system of claim 25, wherein the dimensional modeling includes at least one of a star schema and a snowflake schema.

27. The system of claim 25, wherein the dimensional modeling includes variable depth hierarchies.

28. The system of claim 25, wherein the dimensional modeling includes slowly changing dimensions.

29. The system of claim 25, wherein the dimensional modeling includes standardized hierarchies.

30. The system of claim 21, further comprising a data reception module for receiving at least one of help-desk support information, technical support information, administrative information, training information, planning information, pre-sales call information, and post sales call information.

31. The system of claim 30, wherein the data reorganization module performs aggregation on at least one of the help-desk support information, technical support information, administrative information, planning information, pre-sales call information, post sales call information to contribute to the aggregated information.

32. The system of claim 30, wherein the data organization module performs segmentation on at least of the help-desk support information, technical support information, administrative information, planning information, pre-sales call information, post sales call information to contribute to the segmented information.

33. The system of claim 21, wherein the technology includes at least one of an information processor, a user terminal and a communication network.

34. The system of claim 21, wherein the data modeling module further performs predictive modeling.

35. The system of claim 21, wherein the at least one statistical methodology includes multiple linear regression that implements a stepwise variable selection method.

36. The system of claim 21, wherein the performance includes the person's ability to meet a sales quota.

37. The system of claim 21, wherein presentation module presents the modeled statistical analysis information as at least one report that is displayable in web browser software.

38. The system of claim 37, wherein the at least one report includes hyperlinks to at least one other report.

39. The system of claim 37, wherein the at least one report demonstrates at least one of how the technology is used, when the technology is used, the business processes that are enabled by the technology, the duration of time that the technology is used and how actual technology usage compares with intended technology usage.

40. The system of claim 21, wherein at least the usage information and the performance information are related to at least two people.

41. The system of claim 40, wherein the presentation module provides at least one report that compares at least one of:
   the at least two people's intended usage of the technology versus actual usage of the technology;
   how the at least two people use the technology;
   when the technology is used by the at least two people; and
   the at least two people's duration of time that the technology is used.

42. A system for representing an interaction between a user and a software application, the system comprising:
   a configuration module that operates to receive usage information related to at least one portion of the software application, wherein the usage information represents at least one selected from the group consisting of a display screen viewed by the person, a length of time a data entry display screen is viewed by the person, an on-line transmission with the person, an identifier of a data report accessed by the person, an identifier of a query executed by the person, and an identifier of a component in a data entry display screen accessed by the person;
   a configuration record module that operates to provide an indicia representing the at least one portion in a configuration data record; and
   a usage capture module that operates to provide the indicia from the configuration data record in a usage capture data record when the at least one portion of the software application is accessed by the user of the software application.

43. The system of claim 42, wherein the software application includes CRM/SFA software.

44. The system of claim 42, further comprising configuring the system to operate as a dynamic linked library file.

45. The system of claim 42, wherein the system operates within address space separate from the software application.

46. The system of claim 42, wherein the user capture module further operates to provide an amount of time the at least one portion of the software application is accessed by the user.

47. The system of claim 42, wherein the indicia includes an alphanumeric code.

48. The system of claim 47, wherein the alphanumeric code is represented as a single byte.

49. The system of claim 42, wherein the usage capture module operates without providing explicit reference to itself to a user of the software application.

50. A method for providing a dimensional data model to represent the effectiveness of at least one aspect of technology as a function of performance of at least one sales representative, the method comprising:
   receiving electronic transactional information representing at least an interaction with a sales contact;
   receiving electronic usage information by performing surveillance on a person's interaction with technology, representing at least an interaction between a sales representative and a computer software application, wherein the usage information further represents at least one selected from the group consisting of a display screen viewed by the person, a length of time a data entry display screen is viewed by the person, an on-line transmission with the person, an identifier of a data report accessed by the person, an identifier of a query executed by the person, and an identifier of a component in a data entry display screen accessed by the person;
   receiving electronic ancillary information representing at least one of training provided for the sales representative or technical support provided for the sales representative;
   performing at least one statistical analysis on the electronic transactional information, the electronic usage information and the electronic ancillary information, and performing dimensional modeling on at least one of the electronic transactional information, the electronic usage information and the electronic ancillary information;
   presenting the dimensional modeling in web browser software; and
   presenting a predictive model based on the at least one statistical analysis.

51. The method of claim 50, wherein the statistical analysis includes linear regression technique.

52. The method of claim 50, further comprising receiving electronic sales representative performance information representing at least one sales representative's performance goals and performing the statistical analysis on the electronic sales representative performance information.

53. The method of claim 52, further comprising receiving at least one of electronic training information, electronic background information and electronic experience information, support information, and electronic customer feedback information.

54. A method for providing CRM/SFA usage information for statistical analysis, the method comprising:

monitoring at least one portion of a CRM/SFA system while operated by a user;

referencing a configuration data record to determine whether the at least one portion is identified in the configuration data record;

providing an indicia that represents the at least one portion in a usage capture record after determining that the at least one portion is identified; and transmitting the usage capture record to an information processor.

55. The method of claim 54, wherein the usage capture record is transmitted with transactional information provided by the CRM/SFA system.

56. The method of claim 54, further comprising transmitting the configuration data record with the usage capture data record.

57. The method of claim 54, wherein the usage capture record is provided in a database.

58. The method of claim 54, wherein the indicia is a two character alphanumeric value that is formatted as a single byte.

* * * * *